(12) United States Patent
Boyce et al.

(10) Patent No.: US 10,808,794 B1
(45) Date of Patent: Oct. 20, 2020

(54) TOPOLOGICAL DAMPING MATERIALS AND METHODS THEREOF

(71) Applicant: National Technology & Engineering Solutions of Sandia, LLC, Albuquerque, NM (US)

(72) Inventors: Brad Boyce, Albuquerque, NM (US); Nicholas Leathe, Albuquerque, NM (US); Bradley Howell Jared, Albuquerque, NM (US); Nathan Heckman, Albuquerque, NM (US); Todd Huber, Albuquerque, NM (US); Katarina Adstedt, Atlanta, GA (US); Zachary Casias, Albuquerque, NM (US); William Mook, Albuquerque, NM (US); Bryan James Kaehr, Albuquerque, NM (US); Brian T. Lester, Albuquerque, NM (US); Erich Schwaller, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 73 days.

(21) Appl. No.: 16/358,335

(22) Filed: Mar. 19, 2019

Related U.S. Application Data

(60) Provisional application No. 62/644,700, filed on Mar. 19, 2018.

(51) Int. Cl.
*F16F 7/00* (2006.01)
*F16F 15/02* (2006.01)
*G10K 11/162* (2006.01)

(52) U.S. Cl.
CPC ............ *F16F 15/02* (2013.01); *G10K 11/162* (2013.01); *F16F 2224/005* (2013.01); *F16F 2234/00* (2013.01)

(58) Field of Classification Search
CPC .. F16F 15/02; F16F 2224/005; F16F 2234/00; F16F 7/00; F16F 3/093; F16F 2224/0225; G10K 11/162; Y10T 428/24174; Y10T 156/10
See application file for complete search history.

(56) References Cited

U.S. PATENT DOCUMENTS

| | | | |
|---|---|---|---|
| 7,055,782 B2 * | 6/2006 | Dittrich | B64C 3/46 244/219 |
| 7,195,210 B2 * | 3/2007 | Hamilton | B64C 3/30 244/219 |
| 7,896,294 B2 * | 3/2011 | Dittrich | B64C 3/48 244/219 |
| 7,963,085 B2 | 6/2011 | Sypeck et al. | |
| 8,685,599 B1 | 4/2014 | Adams et al. | |

(Continued)

OTHER PUBLICATIONS

U.S. Appl. No. 15/217,606, filed Jul. 22, 2016, Kaehr et al.

(Continued)

*Primary Examiner* — Thomas W Irvin
(74) *Attorney, Agent, or Firm* — Helen S. Baca; Kevin W. Bieg

(57) ABSTRACT

The present invention features a metamaterial including a plurality of unit cells, in which each unit cell includes two interacting members to dissipate energy. Also provided herein are assemblies including such metamaterials and methods of manufacture.

17 Claims, 13 Drawing Sheets

(56) References Cited

U.S. PATENT DOCUMENTS

| | | | |
|---|---|---|---|
| 8,859,190 B1 | 10/2014 | Dirk et al. | |
| 9,194,452 B2 * | 11/2015 | Hawkins | F16F 3/12 |
| 9,273,305 B1 | 3/2016 | Kaehr et al. | |
| 9,291,543 B1 | 3/2016 | Robinson et al. | |
| 9,382,962 B2 * | 7/2016 | Scarpa | F16F 7/121 |
| 9,494,206 B2 * | 11/2016 | Rajasekaran | F16F 3/093 |
| 9,651,464 B1 | 5/2017 | Salzbrenner et al. | |
| 9,970,000 B2 | 5/2018 | Kaehr et al. | |
| 9,989,447 B1 | 6/2018 | Kaehr et al. | |
| 9,995,359 B2 * | 6/2018 | Martino Gonzalez | F16F 7/12 |
| 10,214,833 B1 | 2/2019 | Kaehr et al. | |
| 2004/0069907 A1 * | 4/2004 | Dockter | B64C 3/46 244/218 |
| 2005/0029406 A1 * | 2/2005 | Dittrich | B64C 3/46 244/221 |
| 2005/0056731 A1 * | 3/2005 | Hamilton | B64C 3/46 244/219 |
| 2006/0129227 A1 * | 6/2006 | Hengelmolen | A61F 2/915 623/1.16 |
| 2006/0286342 A1 * | 12/2006 | Elzey | B22F 3/1115 428/131 |
| 2012/0315456 A1 * | 12/2012 | Scarpa | B32B 3/12 428/221 |
| 2013/0264757 A1 * | 10/2013 | Rajasekaran | F16F 7/00 267/141 |
| 2015/0068584 A1 | 3/2015 | Sweatt et al. | |
| 2017/0268591 A1 | 9/2017 | Harne | |
| 2017/0269188 A1 | 9/2017 | Harne | |
| 2018/0266989 A1 | 9/2018 | Jungjohann et al. | |
| 2019/0058182 A1 | 2/2019 | Pozin et al. | |

OTHER PUBLICATIONS

U.S. Appl. No. 15/282,511, filed Sep. 30, 2016, Kaehr et al.
U.S. Appl. No. 15/924,572, filed Mar. 19, 2018, Wild et al.
U.S. Appl. No. 15/950,905, filed Apr. 11, 2018, Leathe et al.
U.S. Appl. No. 15/968,618, filed May 1, 2018, Argibay et al.
U.S. Appl. No. 16/016,452, filed Jun. 22, 2018, Kaehr et al.
U.S. Appl. No. 16/167,759, filed Oct. 23, 2018, Burchard et al.
U.S. Appl. No. 16/200,413, filed Nov. 26, 2018, Kaehr et al.
U.S. Appl. No. 16/206,722, filed Nov. 30, 2018, Hammetter et al.
U.S. Appl. No. 16/206,704, filed Nov. 30, 2018, Walsh et al.
Alderson A et al., "Auxetic materials," *Proc. IMechE* 2007;221(Part G):565-75.
Aquino W et al., "A gradient-based optimization approach for the detection of partially connected surfaces using vibration tests," *Comput. Methods Appl. Mech. Eng.* 2019;345:323-35.
Asadpoure A et al., "Topology optimization of multiphase architected materials for energy dissipation," *Comput. Methods Appl. Mech. Eng.* 2017;325:314-29.
Babaee S et al., "3D soft metamaterials with negative Poisson's ratio," *Adv. Mater.* 2013;25:5044-9.
Bauer J et al., "Nanolattices: an emerging class of mechanical metamaterials," *Adv. Mater.* 2017;29:Art. 1701850 (26 pp.).
Bilal OR et al., "Bistable metamaterial for switching and cascading elastic vibrations," *Proc. Nat'l Acad. Sci. USA* 2017;114:4603-6.
Bishop J et al., "Leveraging the arrangement of multiple, critically constrained inclusions in resonant metamaterials for control of broadband vibroacoustic energy," *Appl. Acoustics* 2018;130:222-9.
Bückmann T et al., "On three-dimensional dilational elastic metamaterials," *New J. Phys.* 2014;16:033032 (17 pp.).
Bückmann T et al., "Tailored 3D mechanical metamaterials made by dip-in direct-laser-writing optical lithography," *Adv. Mater.* 2012;24:2710-4.
Casadei F et al., "Piezoelectric resonator arrays for tunable acoustic waveguides and metamaterials," *J. Appl. Phys.* 2012;112:064902 (5 pp.).
Chen H et al., "Acoustic cloaking in three dimensions using acoustic metamaterials," *Appl. Phys. Lett.* 2007;91:183518 (3 pp.).
Chen Y et al., "3D printed hierarchical honeycombs with shape integrity under large compressive deformations," *Mater. Design* 2018;137:226-34.
Chen Y et al., "Hierarchical honeycomb lattice metamaterials with improved thermal resistance and mechanical properties," *Composite Struct.* 2016;152:395-402.
Chen Y et al., "Design of a constant-force snap-fit mechanism for minimal mating uncertainty," *Mech. Machine Theory* 2012;55:34-50.
Chen Y et al., "Lattice metamaterials with mechanically tunable Poisson's ratio for vibration control," *Phys. Rev. Appl.* 2017;7:024012 (11 pp.).
Cui S et al., "Characterizing the nonlinear response of elastomeric material systems under critical point constraints," *Int. J. Solids Struct.* 2018;135:197-207.
Evans KE et al., "Auxetic materials: functional materials and structures from lateral thinking!," *Adv. Mater.* 2000;12:617-28.
Fan K et al., "Dynamic electromagnetic metamaterials," *Mater. Today* 2015;18:39-50.
Findeisen C et al., "Characteristics of mechanical metamaterials based on buckling elements," *J. Mech. Phys. Solids* 2017;102:151-64.
Frenzel T et al., "Tailored buckling microlattices as reusable lightweight shock absorbers," *Adv. Mater.* 2016;28:5865-70.
Frenzel T et al., "Three-dimensional mechanical metamaterials with a twist," *Science* 2017;358:1072-4.
Gatt R et al., "A realistic generic model for anti-tetrachiral systems," *Phys. Status Solidi B* 2013;250:2012-9.
Grima JN et al., "Materials that push back," *Nat. Mater.* 2012;11:565-6.
Guenneau S et al., "Acoustic metamaterials for sound focusing and confinement," *New J. Phys.* 2007;9:399 (18 pp.).
Hajela P et al., "Genetic algorithms in truss topological optimization," *Int. J. Solids Struct.* 1995;32:3341-57.
Harne RL et al., "Enhancing broadband vibration energy suppression using local buckling modes in constrained metamaterials," *J. Vibration Acoustics* 2017;139:061004 (9 pp.).
Harne RL et al., "Trapping and attenuating broadband vibroacoustic energy with hyperdamping metamaterials," *Extreme Mech. Lett.* 2017;12:41-7.
Heckele M et al., "Review on micro molding of thermoplastic polymers," *J. Micromech. Microeng.* 2004;14:R1-R14.
Hewage TAM et al., "Double-negative mechanical metamaterials displaying simultaneous negative stiffness and negative Poisson's ratio properties," *Adv. Mater.* 2016;28:10323-32.
Hirt L et al., "Additive manufacturing of metal structures at the micrometer scale," *Adv. Mater.* 2017;29:1604211 (30 pp.).
Hopkins JB et al., "Designing microstructural architectures with thermally actuated properties using freedom, actuation, and constraint topologies," *J. Mech. Design* 2013;135:061004 (10 pp.).
Hopkins JB et al., "Polytope sector-based synthesis and analysis of microstructural architectures with tunable thermal conductivity and expansion," *J. Mech. Design* 2016;138:051401 (10 pp.).
Jang D et al., "Fabrication and deformation of three-dimensional hollow ceramic nanostructures," *Nat. Mater.* 2013;12:893-8.
Jiang Y et al., "Auxetic mechanical metamaterials to enhance sensitivity of stretchable strain sensors," *Adv. Mater.* 2018;30:1706589 (8 pp.).
Kadic M et al., "On the practicability of pentamode mechanical metamaterials," *Appl. Phys. Lett.* 2012;100:191901 (4 pp.).
Lee SH et al., "Acoustic metamaterial with negative modulus," *J. Phys. Condens. Matter* 2009;21:175704 (4 pp.).
Li X et al., "Mechanical metamaterials: smaller and stronger," *Nat. Mater.* 2016;15:373-4.
Liu R et al., "Broadband ground-plane cloak," *Science* 2009;323:366-9.
Lu L et al., "Topology optimization of an acoustic metamaterial with negative bulk modulus using local resonance," *Finite Elements Anal. Design* 2013;72:1-12.
Matlack KH et al., "Composite 3D-printed metastructures for low-frequency and broadband vibration absorption," *Proc. Nat'l Acad. Sci. USA* 2016;113:8386-90.

(56) References Cited

OTHER PUBLICATIONS

McCrum NG, "An internal friction study of polytetrafluoroethylene," *J. Polym. Sci.* 1959;34:355-69.

Meza LR et al., "Strong, lightweight, and recoverable three-dimensional ceramic nanolattices," *Science* 2014;345:1322-6.

Nicolaou ZG et al., "Mechanical metamaterials with negative compressibility transitions," *Nat. Mater.* 2012;11:608-13.

Peng H et al., "Acoustic metamaterial plates for elastic wave absorption and structural vibration suppression," *Int. J. Mech. Sci.* 2014;89:350-61.

Ren X et al., "Experiments and parametric studies on 3D metallic auxetic metamaterials with tuneable mechanical properties," *Smart Mater. Struct.* 2015;24:095016 (15 pp.).

Robbins J et al, "An efficient and scalable approach for generating topologically optimized cellular structures for additive manufacturing," *Additive Manufacturing* 2016;12:296-304.

Salzbrenner BC et al., "High-throughput stochastic tensile performance of additively manufactured stainless steel," *J. Mater. Process. Technol.* 2017;241:1-12.

Sanders C et al., "Design of continuously graded elastic acoustic cloaks," *J. Acoust. Soc. Am.* 2018;143:EL31-6.

Scerrato D et al., "A simple non-linear model for internal friction in modified concrete," *Int. J. Eng. Sci.* 2014;80:136-52.

Scerrato D et al., "Towards the design of an enriched concrete with enhanced dissipation performances," *Cement Concrete Res.* 2016;84:48-61.

Schaedler TA et al., "Ultralight metallic microlattices," *Science* 2011;334:962-5.

Schurig D et al., "Metamaterial electromagnetic cloak at microwave frequencies," *Science* 2006;314:977-80.

Sears NC et al., "Computations and experimental studies on microvascular void features for passive-adaptation of structural panel dynamic properties," *J. Sound Vibration* 2018;412:17-27.

Shalaev VM, "Optical negative-index metamaterials," *Nat. Photonics* 2007;1:41-8.

Shan S et al., "Multistable architected materials for trapping elastic strain energy," *Adv. Mater.* 2015;27:4296-301.

Shin J et al., "Mechanical damping behavior of $Al/C_{60}$-fullerene composites with supersaturated Al—C phases," *Composites Part B* 2015;77:194-8.

Smith DR et al., "Metamaterials and negative refractive index," *Science* 2004;305:788-92.

Sun F et al., "In-plane compression behavior and energy absorption of hierarchical triangular lattice structures," *Mater. Design* 2016;100:280-90.

Syam WP et al., "Design and analysis of strut-based lattice structures for vibration isolation," *Precision Eng.* 2018;52:494-506.

Vuyk P et al., "Illuminating origins of impact energy dissipation in mechanical metamaterials," *Adv. Eng. Mater.* 2018;20:1700828 (5 pp.).

Wang R et al., "Vibration and damping characteristics of 3D printed Kagome lattice with viscoelastic material filling," *Sci. Rep.* 2018;8:9604 (13 pp.).

Wautelet M, "Scaling laws in the macro-, micro- and nanoworlds," *Eur. J. Phys.* 2001;22:601-11.

Wegener M, "Metamaterials beyond optics," *Science* 2013;342:939-40.

Wolf O et al., "Phased-array sources based on nonlinear metamaterial nanocavities," *Nat. Commun.* 2015;6:7667 (6 pp.).

Wu L et al., "Multi-stable mechanical structural materials," *Adv. Eng. Mater.* 2018;20:1700599 (8 pp.).

Yang Z et al., "Membrane-type acoustic metamaterial with negative dynamic mass," *Phys. Rev. Lett.* 2008;101:204301 (4 pp.).

Yeh S et al., "Tailoring concurrent shear and translational vibration control mechanisms in elastomeric metamaterials for cylindrical structures," *Mech. Sys. Signal Processing* 2019;117:609-33.

Yu T et al., "Damping of sandwich panels via acoustic metamaterials," *57th AIAA/ASCE/AHS/ASC Structures, Structural Dynamics, and Materials Conference*, held on Jan. 4-8, 2016 in San Diego, CA (13 pp.).

Yu X et al., "Mechanical metamaterials associated with stiffness, rigidity and compressibility: a brief review," *Prog. Mater. Sci.* 2018;94:114-73.

Zadpoor AA, "Mechanical meta-materials," *Mater. Horizons* 2016;3:371-81.

Zheng X et al., "Ultralight, ultrastiff mechanical metamaterials," *Science* 2014;344:1373-7.

Zhu R et al., "A chiral elastic metamaterial beam for broadband vibration suppression," *J. Sound Vibration* 2014;333:2759-73.

\* cited by examiner

TOPOLOGICAL DAMPING MATERIALS AND METHODS THEREOF

CROSS-REFERENCE TO RELATED APPLICATION

This application claims the benefit of U.S. Provisional Application No. 62/644,700, filed Mar. 19, 2018, which is hereby incorporated by reference in its entirety.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention features a metamaterial including a plurality of unit cells, in which each unit cell includes two interacting members to dissipate energy. Also provided herein are assemblies including such metamaterials and methods of manufacture.

BACKGROUND OF THE INVENTION

Structural metamaterials include synthetic composites that are engineered to possess enhanced properties. In general, particular design features can be created in order to manipulate electromagnetic waves or energy, which in turn provide the desired properties. For instance, by understanding such design features, the resultant metamaterial can be adapted to meet the demands of the specific application. Accordingly, there is a need for further design features and metamaterials.

SUMMARY OF THE INVENTION

The present invention relates, in part, to metamaterials having topological features that enable energy damping. In particular embodiments, the damping metamaterial includes topological features that result in shock, vibration, and/or impact mitigation, such that a single metamaterial can be employed to replace complicated multi-material solutions for shock absorption. In an example, the metamaterial includes a plurality of unit cells, and each unit cell includes a topological feature having at least two interacting members. In one instance, the two members interact when the unit cell is compressed, and coulombic friction arises as a result of this interaction, which in turn imparts a viscous damping character. In another instance, the two members interact to form a chamber to trap gas, which can impart a damping character. In this manner, topological structures can be designed to provide enhanced energy dissipation.

In a first aspect, the present invention features a metamaterial including a plurality of unit cells. In some embodiments, each unit cell includes: a plurality of cell walls defining an inner volume; a first member disposed within the inner volume and including a first planar surface; a second member disposed within the inner volume and including a second planar surface; and an interacting joint, in which activation of the interacting joint provides energy dissipation. In some embodiments, at least two of the cell walls are configured to be elastic walls capable of being displaced along a normal direction. In other embodiments, the interacting movement between the first and second planar surfaces results upon displacement of the elastic walls along the normal direction, where the interacting movement provides energy dissipation.

In some embodiments, the first member and/or the second member includes a comb structure. In particular embodiments, the first member includes a first comb structure, the second member includes a second comb structure, and the first and second comb structures are configured to interlace with one another upon displacement of the elastic walls along the normal direction, where the interlacing movement provides energy dissipation.

In some embodiments, the first member includes a first structure, and the second member includes a second structure configured to be mated with the first structure. In particular embodiments, the first member includes a conical portion providing the first planar surface, the second member includes a chamber portion providing the second planar surface, and the first conical portion is configured to be inserted into the chamber portion upon displacement of the elastic walls along the normal direction, where the insertion movement provides energy dissipation.

In some embodiments, the second member further includes a damping chamber configured to form an enclosed chamber upon contact between the first and second planar surfaces of the interacting joint. In other embodiments, formation of the enclosed chamber provides further energy dissipation.

In some embodiments, each of the plurality of cell walls includes an elastic wall. In other embodiments, the elastic wall includes a first elastic wall section, a second elastic wall section, and an adjoining section disposed between the first and second elastic wall sections. In yet other embodiments, the adjoining section is configured to allow the first and second elastic walls to be displaced along the normal direction and to be extended along a perpendicular direction.

In some embodiments, the plurality of cell walls includes a first horizontal wall, a second horizontal wall, a first sloped wall, a second sloped wall, a third sloped wall, and a fourth sloped wall; and where each of the first, second, third, and fourth sloped walls are disposed between the first and second horizontal walls. In other embodiments, each of the first, second, third, and fourth sloped walls includes an elastic wall. In yet other embodiments, each elastic wall includes a first elastic wall section, a second elastic wall section, and an adjoining section disposed between the first and second elastic wall sections. In particular embodiments, the adjoining section is configured to allow the first and second elastic walls to be displaced along the normal direction and to be extended along a perpendicular direction.

In some embodiments, the interacting joint including a sliding movement between the first and second planar surfaces upon displacement of the elastic walls along the normal direction.

In some embodiments, the first member and/or the second member includes a stem configured to bend upon displacement of the elastic walls along the normal direction.

In a second aspect, the present invention features a metamaterial including a plurality of unit cells, where each unit cell includes a plurality of cell walls defining an inner volume, where the plurality of cell walls includes: a first horizontal wall extending along a first direction, a second horizontal wall disposed above the first horizontal wall and extending along a second direction that is parallel to the first direction, a first wall section, a second wall section, a third wall section, and a fourth wall section, where each of the first, second, third, and fourth wall sections are disposed between the first and second horizontal walls. In some embodiments, the unit cell further comprises: a first member disposed within the inner volume and including a first planar surface, where the first member extends from an inner surface of the first horizontal wall; a second member disposed within the inner volume and including a second planar surface, where the second member extends from an inner surface of the second horizontal wall; and an interacting joint including an interacting movement between the first and second planar surfaces upon displacement of one or more of the plurality of cell walls along the normal direction, where the interacting movement provides energy dissipation.

In some embodiments, the first member further includes a first chamber portion.

In some embodiments, the second member further includes a second chamber portion, where the first and second chamber portions are configured to form an enclosed, damping chamber upon contact between the first and second planar surfaces of the interacting joint. In further embodiments, the formation of the enclosed, damping chamber provides further energy dissipation.

In some embodiments, each of the first, second, third, and fourth wall sections includes a first sloped wall, a second sloped wall, and an adjoining section disposed between the first and second sloped walls. In other embodiments, the adjoining section is configured to allow the first and second sloped walls to be displaced along the normal direction and to be extended along a perpendicular direction.

In some embodiments, the second member includes a plurality of stem sections, and where each stem section includes a planar surface configured to interaction with a portion of the first planar surface of the first member. In other embodiments, the plurality of stem sections forms a second chamber portion. In yet other embodiments, the first and second chamber portions are configured to form an enclosed, damping chamber upon contact between the first planar surface and the planar surfaces of the plurality of stem sections. In other embodiments, formation of the enclosed, damping chamber provides further energy dissipation.

In a third aspect, the present invention features a metamaterial including a plurality of unit cells, where each unit cell includes a plurality of cell walls defining an inner volume (e.g., any described herein). In some embodiments, the unit cell includes: a first member disposed within the inner volume and including a first planar surface and a first chamber portion; a second member disposed within the inner volume and including a second planar surface and a second chamber portion; and an interacting joint including an interacting movement between the first and second planar surfaces. In other embodiments, the first and second chamber portions are configured to form an enclosed, damping chamber upon contact between the first and second planar surfaces of the interacting joint. In yet other embodiments, formation of the enclosed, damping chamber provides further energy dissipation.

In a fourth aspect, the present invention features a metamaterial including a plurality of unit cells, where each unit cell includes: a plurality of cell walls defining an inner volume; a first member disposed within the inner volume and including a conical portion providing a first planar surface; a second member disposed within the inner volume and including a second chamber portion and a third chamber portion providing a second planar surface, where the third chamber portion is configured to receive the conical portion of the first member; and an interacting joint including an insertion movement between the first member and the second member.

In some embodiments, the insertion movement occurs upon displacement of the first, second, third, and fourth wall sections along the normal direction. In other embodiments, the insertion movement includes insertion of the conical portion of the first member into the third chamber portion of the second member, where the insertion movement provides energy dissipation.

In some embodiments, the conical portion includes a first chamber portion.

In some embodiments, the first and second chamber portions are configured to form an enclosed, damping chamber upon contact between the first and second planar surfaces of the interacting joint. In other embodiments, formation of the enclosed, damping chamber provides further energy dissipation.

In fifth aspect, the present invention features an assembly including a metamaterial (e.g., any described herein), where the metamaterial includes an array of the plurality of unit cells (e.g., any described herein). In some embodiments, the assembly includes an inner layer including a metamaterial (e.g., any described herein); a top layer disposed above the metamaterial; and a bottom layer disposed below the metamaterial.

In any embodiment herein, the plurality of cell walls includes: a first horizontal wall extending along a first direction, a second horizontal wall disposed above the first horizontal wall and extending along a second direction that is parallel to the first direction, a first wall section, a second wall section, a third wall section, and a fourth wall section, where each of the first, second, third, and fourth wall sections are disposed between the first and second horizontal walls.

In any embodiment herein, the interacting joint includes a sliding joint.

In any embodiment herein, the interacting joint includes an insertion joint. In some embodiments, the insertion movement includes insertion of a portion of the first member into a chamber portion of the second member, where the insertion movement provides energy dissipation.

In any embodiment herein, the first member extends from an inner surface of the first horizontal wall.

In any embodiment herein, the first member includes a conical portion providing a first planar surface. In some embodiments, the conical portion further includes a first chamber portion.

In any embodiment herein, the second member extends from an inner surface of the second horizontal wall.

In any embodiment herein, the second member includes a second chamber portion, where the second chamber portion is configured to trap gas and/or to form a gas damping chamber (e.g., upon being in proximity to a first chamber portion of the first member.

In any embodiment herein, the second member includes a third chamber portion providing a second planar surface, where the third chamber portion is configured to receive the first member.

In any embodiment herein, the first member includes a first chamber portion, and the second member includes a second chamber portion. In some embodiments, the first and second chamber portions are configured to form an enclosed, damping chamber upon contact between the first and second planar surfaces of the interacting joint. In some embodiments, formation of the enclosed, damping chamber provides further energy dissipation.

Definitions

As used herein, the term "about" means +/−10% of any recited value. As used herein, this term modifies any recited value, range of values, or endpoints of one or more ranges.

By "fluidic communication," as used herein, refers to any duct, channel, tube, pipe, chamber, or pathway through which a substance, such as a liquid, gas, or solid may pass substantially unrestricted when the pathway is open. When the pathway is closed, the substance is substantially restricted from passing through. Typically, limited diffusion of a substance through the material of a plate, base, and/or a substrate, which may or may not occur depending on the compositions of the substance and materials, does not constitute fluidic communication.

By "micro" is meant having at least one dimension that is less than 1 mm and, optionally, equal to or larger than about 1 µm. For instance, a microstructure (e.g., any structure described herein) can have a length, width, height, cross-sectional dimension, circumference, radius (e.g., external or internal radius), or diameter that is less than 1 mm.

By "nano" is meant having at least one dimension that is less than 1 µm but equal to or larger than about 1 nm. For instance, a nanostructure (e.g., any structure described herein, such as a nanoparticle) can have a length, width, height, cross-sectional dimension, circumference, radius (e.g., external or internal radius), or diameter that is less than 1 µm but equal to or larger than 1 nm. In other instance, the nanostructure has a dimension that is of from about 1 nm to about 1 µm.

As used herein, the terms "top," "bottom," "upper," "lower," "above," and "below" are used to provide a relative relationship between structures. The use of these terms does not indicate or require that a particular structure must be located at a particular location in the apparatus.

Other features and advantages of the invention will be apparent from the following description and the claims.

DETAILED DESCRIPTION OF THE INVENTION

The present invention relates, in part, to a metamaterial comprising a plurality of unit cells. Each unit cell, in turn, includes topological features to more effectively dissipate energy upon compression of the unit cell. These topological features can include members that interact upon compression, and in which the interaction result in generating coulombic friction to dissipate energy. In another aspect, the members interact to form a chamber, which provides viscous damping effects. In this manner, the topological features dissipate energy more effectively than using the underlying materials alone.

Figure 1:
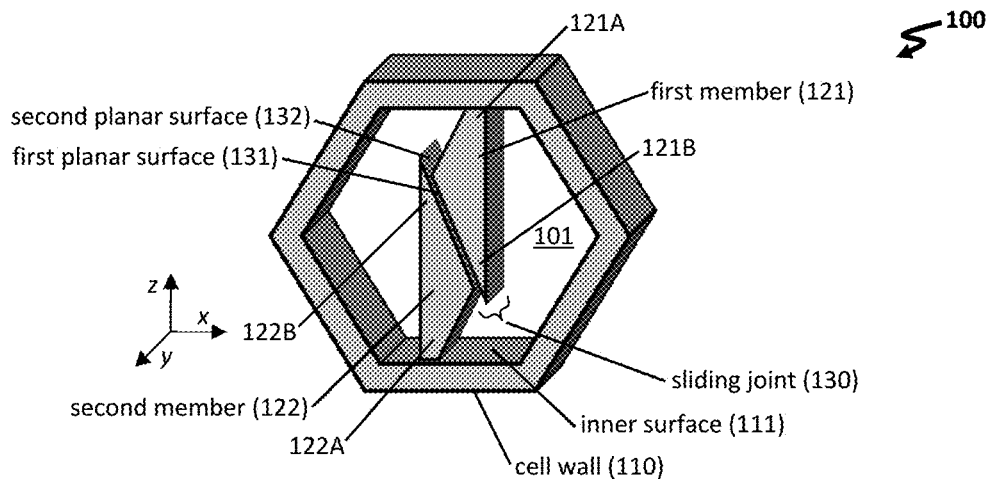
FIG. 1 provides a schematic of an exemplary unit cell 100.

FIG. 1 provides an exemplary unit cell 100 having a plurality of cell walls 110 defining an inner volume 101. Each cell wall includes an inner surface 111, in which one or more members can extend from the inner surface. In this exemplary unit cell, a first member 121 extends from the inner surface of a top horizontal wall, and a second member 122 extends from the inner surface of another horizontal wall (the bottom wall).

Each unit cell can include an interaction, such as a joint, that forms upon compressing the unit cell. This joint, in turn, includes an interaction between different members in order to more effectively dissipate applied energy. As seen in FIG. 1, upon compressing the unit cell along a normal direction (e.g., along the z-axis), a sliding joint 130 forms. This joint includes a first planar surface 131 of the first member 121 and a second planar surface 132 of the second member 122. Friction arises from the first planar surface 131 rubbing against the second planar surface 132, thereby allowing for energy dissipation by way of coulombic friction.

The unit cell can include other topological features to provide further damping of applied compressive force. In one instance, a damping chamber can be formed upon compressing the unit cell, in which the damping chamber traps gas to provide a viscous damping effects. Thus, a unit cell can include members for dissipation by way of coulombic friction, as well as various chamber portions to form an enclosed damping chamber.

Figure 2A:
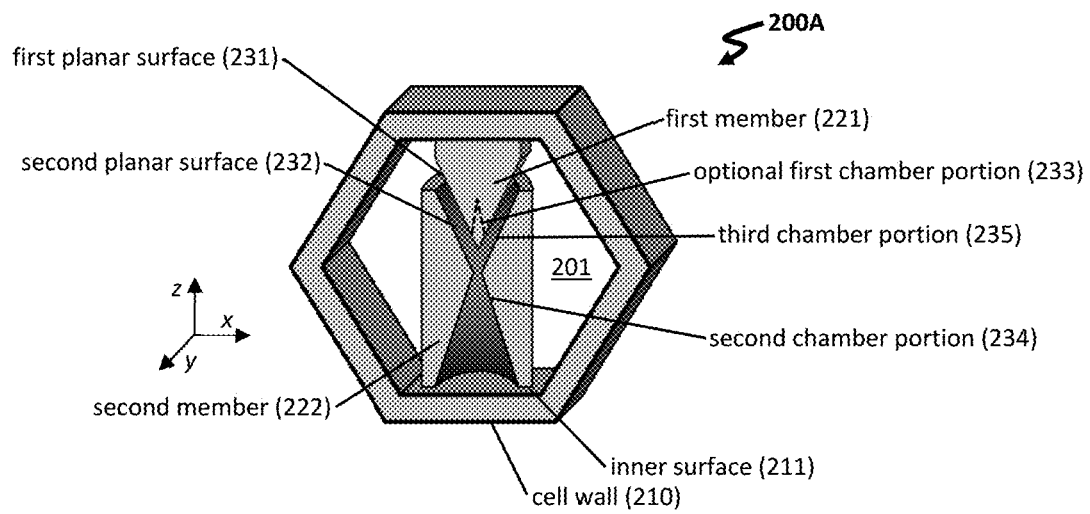
FIG. 2A-2B provides a schematic (FIG. 2A) of another exemplary unit cell 200A prior to displacement and a schematic (FIG. 2B) of that unit cell 200B after displacement.

FIG. 2A provides an exemplary unit cell 200A having a first member 221 having a first planar surface 231, as well as a second member 222 having a second planar surface 232. The unit cell further includes a plurality of cell walls 210 defining an inner volume 201, in which each cell wall includes an inner surface 211. The first and second members can extend from any useful inner surface of one or more cell walls and can extend into any useful portion of the inner volume.

The first and second members can include any other useful chambers or chamber portions. In one non-limiting instance, the first member includes a conical portion configured to be inserted into a chamber portion of the second member. As seen in FIG. 2A, the first member 221 includes an exemplary conical portion configured to be inserted into a third chamber portion 235 of the second member. In another non-limiting instance, the first and second members and include chamber portions configured to form a damping chamber. As seen in FIG. 2A, the first member can include an optional first chamber portion 233, and the second member can include a second chamber portion 234. Together, the first and second chamber portions 233,234 can form a damping chamber.

The unit cell can include any useful features to accommodate displacement of the cell walls along a normal direction. In general, the normal direction is parallel to the main longitudinal axis of the first and second members. In particular embodiments, as seen in FIG. 1, the first member 121 extends from a cell wall along a longitudinal axis, in which the proximal end 121A of the first member is attached to the cell wall and the distal end 121B extends into the inner volume 101. The longitudinal axis extends from the proximal end 121A to the distal end 121B along the z-axis. Similarly, the second member 122 includes a proximal end 122A attached to the cell wall and a distal end 122B extending into the inner volume 101. Compression of the unit cell can result in displacement of the cell walls. Again, taking FIG. 1, compression of the unit cell along the longitudinal axis (e.g., along the z-axis for unit cell 100) can result in displacement of the horizontal walls (along the z-axis), which allows the first and second planar surfaces to interact more closely.

Figure 2B:
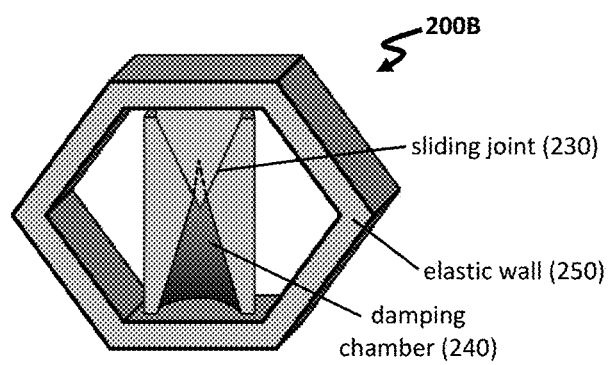

FIG. 2B provides another unit cell 200B after displacement of the cell walls along a normal direction. As can be seen, prior to compression, the first member and second member are separated (see FIG. 2A). After compression, displacement (of the cell walls) results in the first member and the second member to interact (see FIG. 2B), thereby forming a sliding joint 230. This joint, or interaction, results in the generation of coulombic friction, which dissipates energy imparted by the compressing the unit cell. Interaction between the first and second members can be accommodated by employing elastic walls, which allow the first and second members to be in contact in a controlled manner. As seen in FIG. 2B, the elastic walls 250 allows for vertical compression (along the z-axis) and horizontal extension or bulging (along the x-axis) in a controlled manner. If additional chamber portions are employed, then displacement of the cell walls also allows for forming a damping chamber 240, which can trap gas or fluid for further damping effects.

The unit cell can include any useful features to provide damping effects. As can be seen, structural features that those that generate dissipative forces to relieve applied compression. Coulombic friction members, as well as damping chambers, are described herein. The members can further include one or more stems that facilitate bending of the members upon applying a compressive force, e.g., upon displacement of the elastic walls along the normal direction.

Figure 3A:
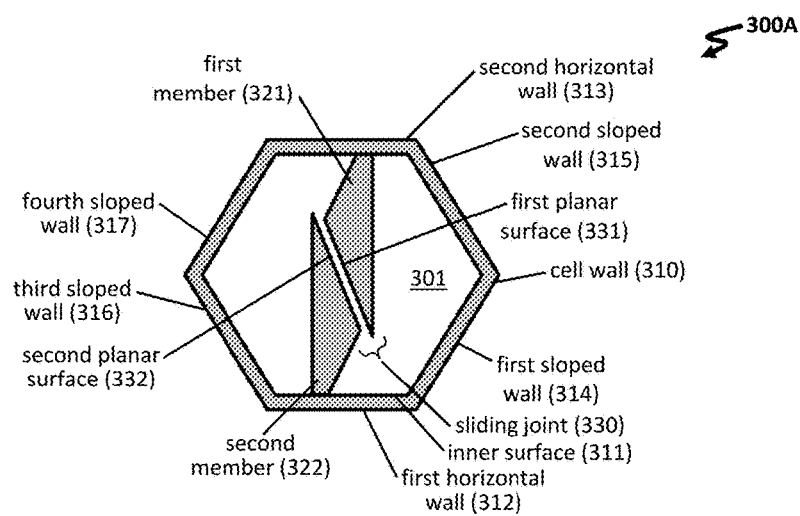
FIG. 3A-3B provides a schematic (FIG. 3A) of yet another exemplary unit cell 300A prior to displacement and a schematic (FIG. 3B) of that unit cell 300A before displacement and the unit cell 300B,300C after displacement.

FIG. 3A provides another exemplary unit cell 300A having a plurality of cell walls 310 defining an inner volume 301, a first member 321, a second member 322, and a sliding joint 330 formed by an interaction between the first planar surface 331 and the second planar surface 332. Any useful combination of cell walls may be constructed. In one instance, the unit cell includes two horizontal walls, e.g., a first horizontal wall 312 extending along a first direction and a second horizontal wall 313 extending along a second direction that is parallel to the first direction. The unit cell can include further walls to connect the horizontal walls. In one instance, further walls can include a first sloped wall 314 connected to a second sloped wall 315, as well as a third sloped wall 316 connected to a fourth sloped wall 317.

The first and second members can extend from any useful wall. In one instance, a first member 321 extends from an inner surface of the second horizontal wall 313, and the second member 322 extends from an inner surface 311 of the first horizontal wall 312.

Figure 3B:
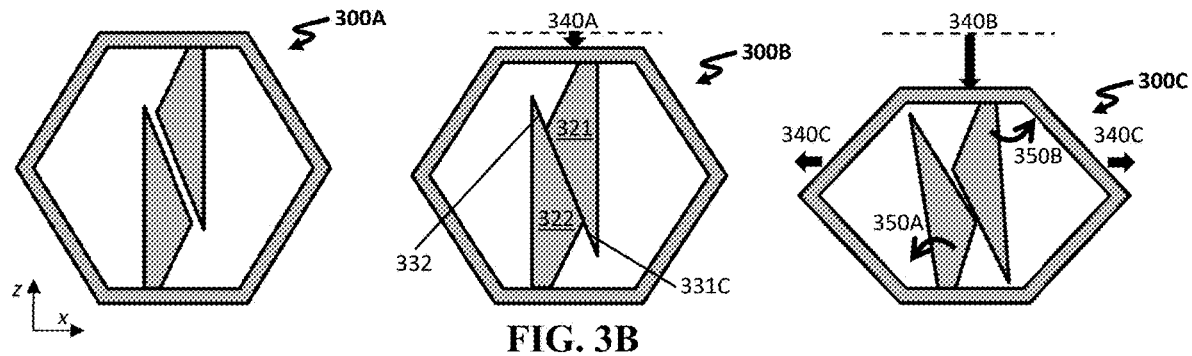

FIG. 3B provides the exemplary unit cell 300A, in which the walls are displaced along a normal direction over different displacement distances. Provided is a schematic of the unit cell 300A prior to compression. Upon being displaced 340A for a particular displacement distance along a normal direction, the resultant unit cell 300B includes a sliding joint having the planar surface 331 of the first member 321 to be in contact with the second planar surface 332 of the second member 322. Further displacement 340B along a normal direction provides a further unit cell 300C, which can result in horizontal extension or bulging 340C of the walls as well as bending 350A,350B or rotation at the proximal ends of the first and second members.

The first and second members can include any useful structural features to generate coulombic friction. In one instance, the first and second members can include planar surfaces that interact to form a sliding joint (see, e.g., FIG. 3A). In another instance, the first and second members can include intercalating structures that form an interlacing joint (see, e.g., FIG. 4A).

Figure 4A:
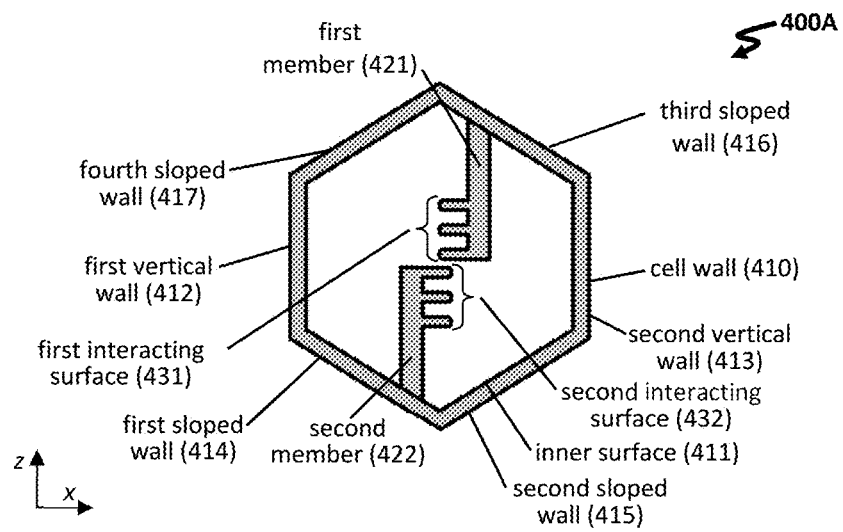
FIG. 4A-4B provides a schematic (FIG. 4A) of another exemplary unit cell 400A prior to displacement and a schematic (FIG. 4B) of that unit cell 400B after displacement.

FIG. 4A provides an exemplary unit cell 400A prior to compression. As can be seen, the unit cell includes a plurality of cell walls 410 defining an inner volume, a first member 421 having a first interacting surface 431 including a comb structure, and a second member 422 having a second interacting surface 432 including a comb structure. The first and second members extend from an inner surface 411 of the cell walls. The unit cell also includes two vertical walls, e.g., a first vertical wall 412 extending along a first direction and a second vertical wall 413 extending along a second direction that is parallel to the first direction. The unit cell can include further walls to connect the vertical walls, e.g., a first sloped wall 414 connected to a second sloped wall 415, as well as a third sloped wall 416 connected to a fourth sloped wall 417.

Figure 4B:
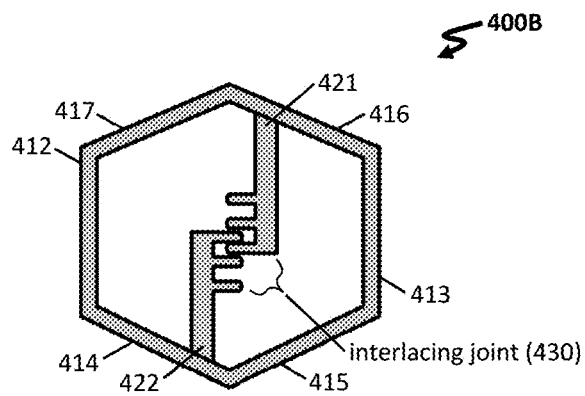

Upon displacing the walls along a normal direction, the unit cell includes an interlacing joint 430 formed by the interaction between the comb structures of the first and second members 421,422. Any useful combination of walls can be displaced. As seen in FIG. 4B, applying a compressive force along the normal direction (the z-axis for unit cell 400A,400B) results in squeezing the sloped walls 414-417 and possibly shortening the vertical walls 412,413.

Figure 5:
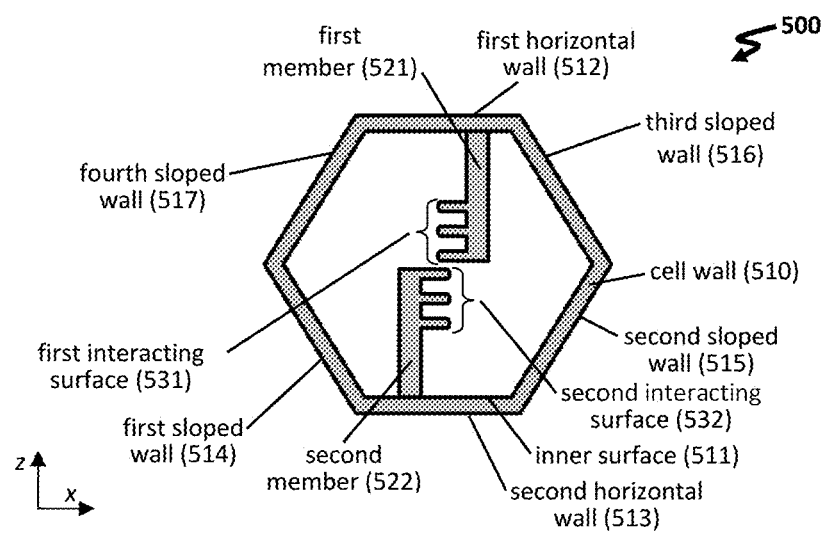
FIG. 5 provides a schematic of an exemplary unit cell 500 having a first member 521 and a second member 522, in which each member includes a comb structure.

The first and second members can be located and disposed on any useful cell wall. As seen in FIG. 4A, the unit cell can include a first member 421 extending from a sloped wall 416. Alternatively, as seen in FIG. 5, a different configuration can include a unit cell 500 having a first member 521 extending from a horizontal wall 512. Note that in both configurations of the unit cells 400A,500, the normal direction is the same (along the z-direction) because the longitudinal axis is still defined by the directionality and position of the first and second members 421,422,521,522.

FIG. 5 provides another exemplary unit cell 500 having a plurality of cell walls 510 defining an inner volume, a first member 521 having a first interacting surface 531 including a comb structure, and a second member 522 having a second interacting surface 532 including a comb structure. The first and second members extend from an inner surface 511 of the first horizontal wall 512 extending along a first direction and a second horizontal wall 513 extending along a second direction that is parallel to the first direction. The unit cell can include further walls to connect the horizontal walls, e.g., a first sloped wall 514 connected to a fourth sloped wall 517, as well as a second sloped wall 515 connected to a third sloped wall 516.

Figure 6A:
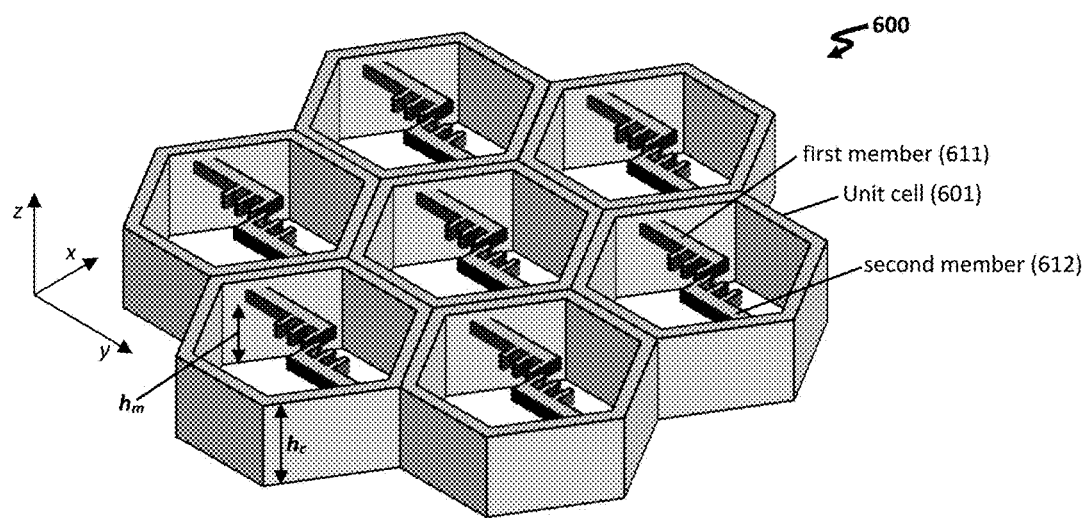
FIG. 6A-6C provides a schematic (FIG. 6A) of an array 600 of cell units, a schematic (FIG. 6B) of an exemplary assembly 6000 including an array 6030, and a schematic (FIG. 6C) of another exemplary assembly 6500.

The metamaterial can include an array of any unit cell described herein. Such arrays can include two-dimensional arrays (e.g., along an xy plane) or three-dimensional arrays. FIG. 6A provides an exemplary assembly 600 including a two-dimensional array of unit cells 601, in which each unit cell can include any useful arrangement of first and second members 611,612. In one embodiment, each unit cell in the array includes the same arrangement of first and second members (e.g., any unit cell described herein). In another embodiment, the array includes a plurality of unit cells, in which at least two unit cells includes a different arrangement of first and second members. In yet another embodiment, the array is a three-dimensional array including a plurality of layers, in which each layer includes a plurality of unit cells (e.g., any described herein). In one instance, each layer is the same. In another instance, each layer is different (e.g., in which a first layer includes a plurality of first unit cells and a second layer includes a plurality of second unit cell, and the first and second unit cells are different). Such differences can include a difference in the number of unit cells per layer or per array, in the arrangement or geometry of the first and second members, and/or in the materials of which the unit cells are made.

Figure 6B:
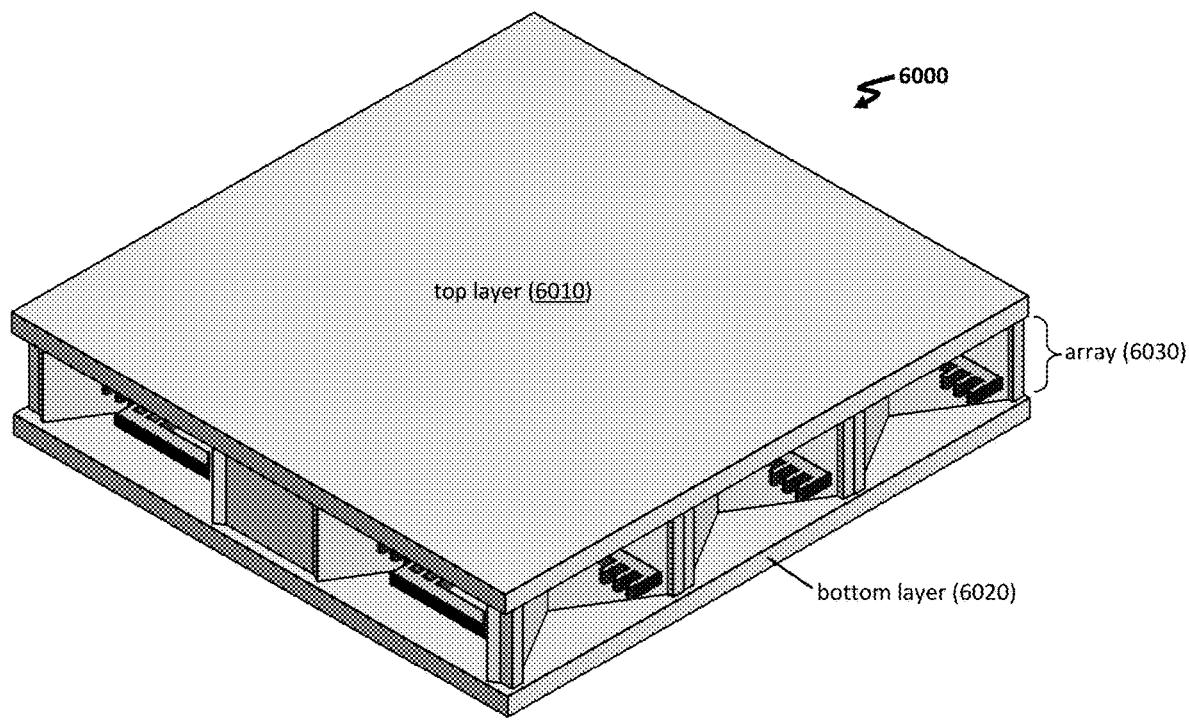
Figure 6C:
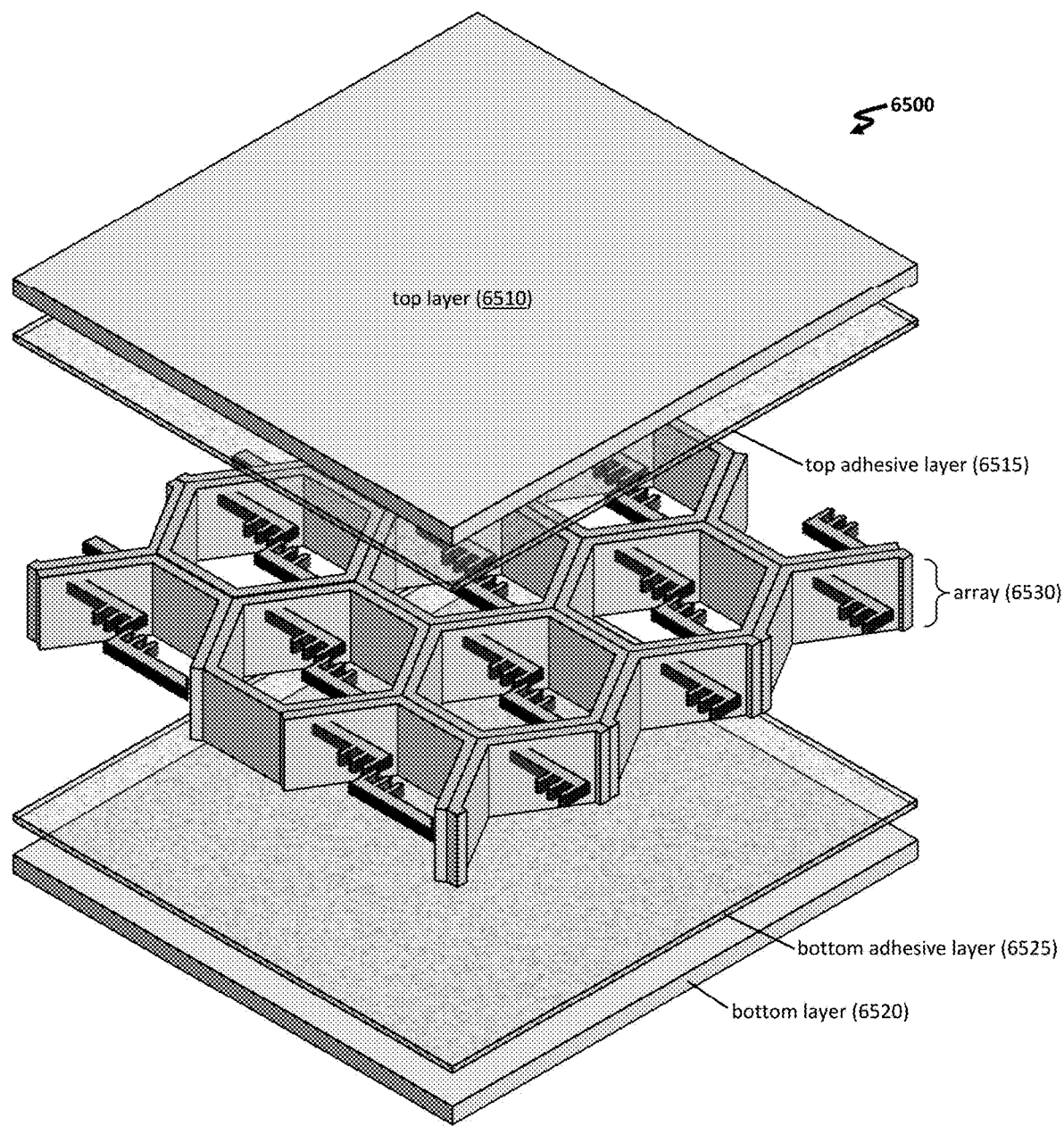

The metamaterial can be provided as a composite structure. As seen in FIG. 6B, in one embodiment, the assembly 6000 includes a top layer 6010, a bottom layer 6020, and an array 6030 (e.g., including a plurality of unit cells, such as any herein) disposed between the top and bottom layers. As seen in FIG. 6C, in another embodiment, the assembly 6500 includes a top layer 6510, a top adhesive layer 6515 disposed beneath the top layer, a bottom layer 6520, a bottom adhesive layer 6525 disposed above the bottom layer, and an array 6530 (e.g., including a plurality of unit cells, such as any herein) disposed between the top and bottom adhesive layers.

The cell walls can define any useful inner volume. In one instance, the cell walls are directed to hexagon, honeycomb topology, in which six cell walls are employed to define hexagonal inner volume. In another instance, the cell walls are directed to a re-entrant honeycomb topology, in which six cell walls are employed to define an hour-glass shaped, hexagonal inner volume. Other topologies include chiral honeycomb, star-shaped, and double arrowhead topologies. Further topologies are described in Alderson A et al., "Auxetic materials," *Proc. IMechE* 2007; 221(Part G):565-75, which is incorporated herein by reference in its entirety.

Chambers

The present materials and assemblies can include one or more chambers, which can be configured to substantially enclose a fluid or a substance. Such chamber can include one or more inlets, outlets, fluidic opening (e.g., vias), fluidic barriers, or any other structure to minimize fluidic communication between one or more chambers, sample ports, vents, etc. Exemplary chambers can have any useful geometry or dimension.

Materials

The metamaterials and unit cells can be formed from any useful material. Exemplary materials include optically clear materials (e.g., a glass, a photoresin, a polymer, etc.), opaque substrates (e.g., silicon, carbon fiber, etc.), metals (e.g., copper, silver, nickel, gold, titanium, aluminum, steel, etc.), oxides (e.g., metal oxides, such as alumina; silica), ceramics (e.g., silicates), plastics (e.g., a thermoplastic, polyethylene, polypropylene, polyester, nylon, etc.), polymers, glasses (e.g., chalcogenide glass, glassy carbon, or a metallic glass), as well as combinations thereof (e.g., a metal-polymer composite, or a ceramic-polymer composited) and any described herein. Further materials are described in Bauer J et al., "Nanolattices: an emerging class of mechanical metamaterials," *Adv. Mater.* 2017; 29:Art. 1701850 (26 pp.) and U.S. Pat. No. 7,963,085, which is incorporated herein by reference in its entirety.

Exemplary photoresins can include any useful two-photon polymerization (2PP) optimized materials or UV-photocurable photoresists, including and without limitation, an epoxy-based photoresist (e.g., SU-8, an epoxy-based bisphenol A novolac photoresist), an acrylate-based photoresist (e.g., an organically modified ceramic, such as Ormocer® or OrmoComp® from micro resist technology GmbH, Berlin, Germany), the IP series of UV-curable photoresists developed by Nanoscribe GmbH, Eggenstein-Leopolds-hafen, Germany (e.g., IP-Dip, IP-L 780, IP-G 780, and IP-S photoresists), the AZ® series of photoresists available from Microchemicals GmbH, Ulm, Germany (e.g., AZ® 9200 series of positive photoresists, such as AZ® 9260 and AZ® 9245; the AZ® series of chemically amplified, positive photoresists, such as AZ® 12 XT and AZ® 40XT; AZ® MiR™ series of positive photoresists, such as AZ® MiR™ 701 14CP and AZ® MiR™ 701 29 CP; and AZ® 5200 series of image reversal, lift-off photoresists, such as AZ® 5209E and AZ® 5214E), acrylic-based photopolymer (e.g., FullCure® materials, such as the FullCure® Vero series (8XX series, such as FullCure® 850), the FullCure® General Purpose series (7XX series, such as FullCure® 720), the FullCure® Durus series (e.g., FullCure®430), and the FullCure® Tango series (9XX series, such as FullCure®930)), etc.

Yet additional materials include a polymer (e.g., thermoplastic polymer), such as polymethyl methacrylate (PMMA), polyethylene terephthalate (PET, e.g., biaxially-oriented PET or bo-PET), an acrylic polymer, poly(dimethylsiloxane) (PDMS), polycarbonate (PC), polyamide (PA), polysulfone (PSU), cyclo-olefin copolymer (COC), polyethylene terephthalate glycol (PETG), polyethylene (PE, such as branched homo-polymer PE), polyetheretherketone (PEEK), polyvinylchloride (PVC), polystyrene (PS), styrene copolymer, polyimide (PI), polypropylene (PP), polytetrafluoroethylene (PTFE), perfluoroalkoxy copolymer (PFA), polyvinylidinefluoride (PVDF), polynorbornene (PN), polyoxymethylene (POM), poly(4-methyl-1-pentene), silicone, and combinations or co-polymers thereof. Polymers can include any useful additive, such as, e.g., fillers (e.g., mica, talc, or calcium carbonate), plasticizers (e.g., dioctyl phthalate), heat stabilizers (e.g., organo-tin compounds), antioxidants (e.g., phenols or amines), and/or UV stabilizers (e.g., benzophenones or salicylates). Such materials can be provided in any useful form, such as in one or more layers that can be optionally laminated.

Exemplary manufacturing methodologies include additive manufacturing techniques, electron beam lithography (EBL), direct laser writing (DLW), direct laser lithography, photolithography, near-field optical lithography, nanoimprint lithography (NIL), deep UV lithography (DUV), extreme UV lithography (EUV), multiphoton polymerization (MPP) lithography, dip pen lithography (DPL), scanning tunneling microscopy lithography, atomic force microscopy lithography, microstereolithography, molecular beam epitaxy (MBE), ink jet printing, electrohydrodynamic (EHD) jet printing, focused-ion-beam (FIB) milling, and deposition techniques (e.g., any described herein).

Further steps can be employed to provide any useful material. In one non-limiting instance, photocurable photoresists can be employed to form a microtemplate, and other materials may be deposited on that template. Exemplary deposition techniques include electroplating, electroless plating, electrodeposition, chemical vapor deposition (CVD, including laser assisted CVD), atomic layer deposition (ALD), localized electrochemical deposition (LECD), electron-beam evaporation, galvanization, casting, metal infiltration, laser-induced forward transfer (LIFT), etc., of any useful material (e.g., a polymer, a metal, a metal oxide, a glass, including alloys and combinations thereof). Additional methodologies and materials are described in Hirt L et al., "Additive manufacturing of metal structures at the micrometer scale," *Adv. Mater.* 2017; 29: Art. 1604211 (30 pp.), which is incorporated herein by reference in its entirety.

Composite structures can have a metamaterial disposed between any useful sandwich layer. Exemplary materials for materials can include a backing material (e.g., a polymer layer, a metal layer, ceramic layer, or any other layer of a material described herein), an adhesive material, or combinations thereof. Exemplary composite structures include sandwich panel construction materials. Exemplary adhesive materials include an acrylate (e.g., a silicone acrylate, a polymethyl acrylate, a polymethyl methacrylate, including those formed from 2-ethyl hexyl acrylate or n-butyl acrylate monomers, etc., such as any having a melting temperature of about 160° C.), a polyolefin (e.g., polyethylene, polybutene, or polypropylene), an acetate (e.g., an ethylene-vinyl acetate having a melting temperature of about 110° C.), a styrene (e.g., a polystyrene, a styrene block copolymer (e.g., styrene-butadiene-styrene, styrene-isoprene-styrene, styrene-ethylene/butylene-styrene, or styrene-ethylene/propylene), an isobutylene (e.g., polyisobutylene, a copolymer of isobutylene with isoprene, including copolymers thereof, as well as any having a melting temperature of about 100° C.), a rubber (e.g., a polyisoprene, a silicone rubber, a polychloroprene, a polyisobutylene, as well as copolymers of any of these), a polyamide, a polyester, a polyurethane, a polynitrile (e.g., nitrile butadiene rubber), a polyether (e.g., a vinyl ether), etc. The adhesive material can be provided in any useful format. For instance, the adhesive material can be provided as a substantially planar substrate.

EXAMPLES

Example 1: Topological Damping Metamaterials

Structural metamaterials, known variously as architected materials, periodic cellular structures, micro-trusses, honeycombs, or lattices, have gained widespread attention. We have created a new sub-class of these materials in which the topology enables broadband damping of vibrations and shocks. Metals, ceramics, and glassy polymers, which in bulk form possess little or no internal damping, can be transformed into highly dissipative energy absorbers. The unusual mechanical properties are facilitated by creating mesoscale features that impart coulombic friction and/or pneumatic damping. The resulting metamaterial possesses energy damping characteristics that are quite distinct from the base material or conventional lattices. In addition, the damping characteristics are tailorable to meet the demands of the specific application.

Topological damping materials can be tuned based on desired performance. Such tuning can be facilitated by additive manufacturing techniques, which can fabricate these topologies as well as multilayer assemblies. From laser powder bed fusion to two-photon lithography, the concept applies to techniques that can produce complex geometric features.

Feature size can play a critical role in designing mechanical characteristics. For instance, by fabricating the mesoscale features of the topological structure at sub-micrometer dimensions, the topology can take advantage of the phenomena colloquially known as "smaller is stronger," see e.g., Li X et al., "Mechanical metamaterials: smaller and stronger," *Nat. Mater.* 2016; 15:373-4. Classical mechanisms for deformation are suppressed at these smaller scales, rendering an unusually strong structure.

Further optimization of unit cell architecture may require computational solutions. For instance, while rudimentary analytic equations can be derived for these metamaterials, high-fidelity prediction may benefit from structural dynamics and multiscale contact mechanics simulations. In addition, homogenization of unit cell response can enable the computational efficiency necessary to design large-scale structures that maximize mechanical performance, see, e.g., Robbins J et al, "An efficient and scalable approach for generating topologically optimized cellular structures for additive manufacturing," *Additive Manufacturing* 2016; 12:296-304, which is incorporated herein by reference in its entirety.

Such topological damping metamaterials can be employed in any useful application. For instance, such metamaterials may enable shock, vibration, and impact mitigation through extrinsic damping, thereby replacing complex multi-material solutions, such as shock absorbers.

When exposed to a mechanical energy impact, the designed metamaterial can control and redistribute the energy by, e.g., shifting the resonant response spectrum and/or phonon transmission. Application space is broad including, e.g., aerospace, transportation, defense, and sports equipment.

Existing architected lattice materials, such as honeycomb or micro-truss designs, employ elasticity and plasticity to dissipate impact energy. For instance, elasticity of a lattice material can be improved by using struts or other structures to bend, tense, compress, or buckle when exposed to an applied load. The metamaterials herein, however, employ damping modes, such as coulombic friction or pneumatic damping.

Resultant metamaterials can have tunable viscoelastic properties that are not limited by the base material(s) used to construct a unit cell. Rather, topological features impart viscoelastic properties, such that even a metal-based or ceramic-based metamaterial can possess viscous mechanical performance akin to rubber or other soft materials. Such topological features (e.g., interacting members through coulombic friction or damping chambers, such as any herein) can dampen vibrations internally and absorb energy reversibly. Exemplary uses include metamaterials as vibration isolation pads, mechanical cloaking materials that diffuse and redirect impact energy, single-material shock absorbers, electrical (or thermal) conductors that dissipate earthquake insult, flexible electronics that survive shock environments, rubber-like materials that can conduct electricity for survivable power grid applications, or high-temperature rocket nozzles that are soft to the touch yet can survive impact landings. Through this advance, any material can have tailorable rubber-like qualities.

Example 2: Lattice Metamaterials Having Elements to Impart Coulombic Friction

Described herein is an architected lattice metamaterial, in which the structural functionality of the material is modified by topological design. Unusual mechanical properties are facilitated by creating mesoscale features that impart either coulombic friction and/or gas damping. The resulting metamaterial can possess energy damping characteristics that are quite distinct from the base material.

Existing aluminum honeycomb structures are widely used in engineering design for lightweight impact absorption. The honeycomb technology is an existing lattice architecture that can be modified for topological damping through the incorporation of a coulombic element. For instance, FIG. 4A shows a honeycomb structure defined by the cell walls, in which coulombic friction is added by introducing a first and second member 421, 422 disposed within the hex cell. As can be seen, the members include interacting surfaces, which in turn include comb structures. These comb structures are illustrative, and other interacting structures can be employed. As the hex cell is compressed (as in FIG. 4B), the bristles of the two combs will rub against each other. The phenomenon, known as coulombic friction, imparts a viscous damping character to the lattice structure.

Figure 7A:
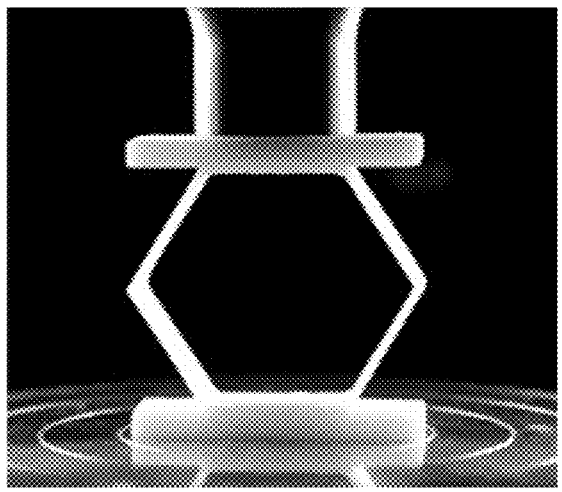
FIG. 7A-7D provides photographs (FIG. 7A-7B) of an exemplary unit cell having a plurality of cell walls prior to displacement (FIG. 7A) and after displacement (FIG. 7B), as well as photographs (FIG. 7C-7D) an exemplary unit cell including members configured for topological dampening prior to displacement (FIG. 7C) and after displacement (FIG. 7D).
Figure 7B:
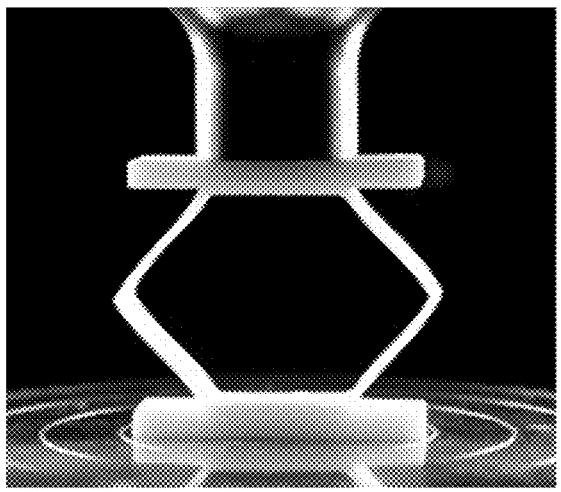
Figure 7C:
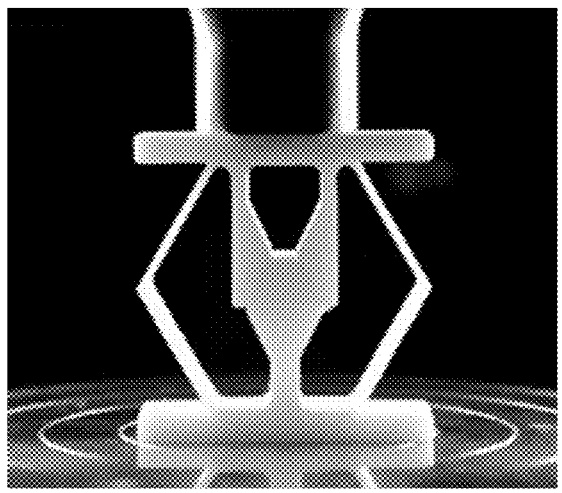
Figure 7D:
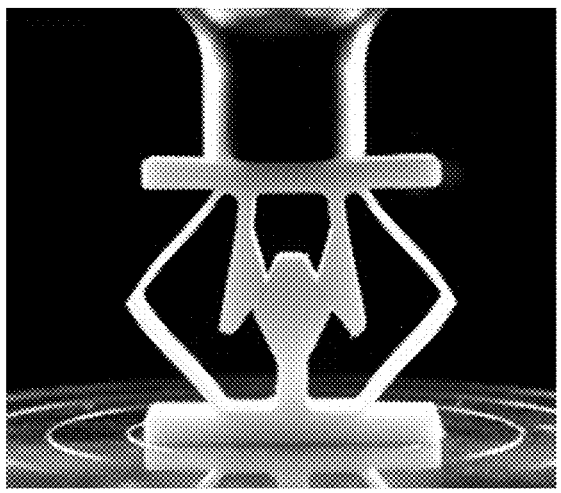
Figure 8A:
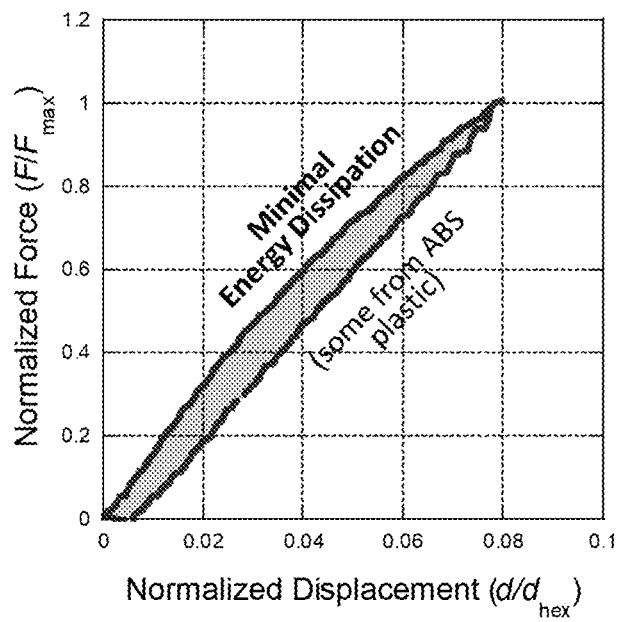
FIG. 8A-8B provides a force displacement graph (FIG. 8A) for an exemplary unit cell having a plurality of cell walls (as in FIG. 7A-7B) and a force displacement graph (FIG. 8B) for an exemplary unit cell having a plurality of cell walls with members configured for topological dampening (as in FIG. 7C-7D).
Figure 8B:
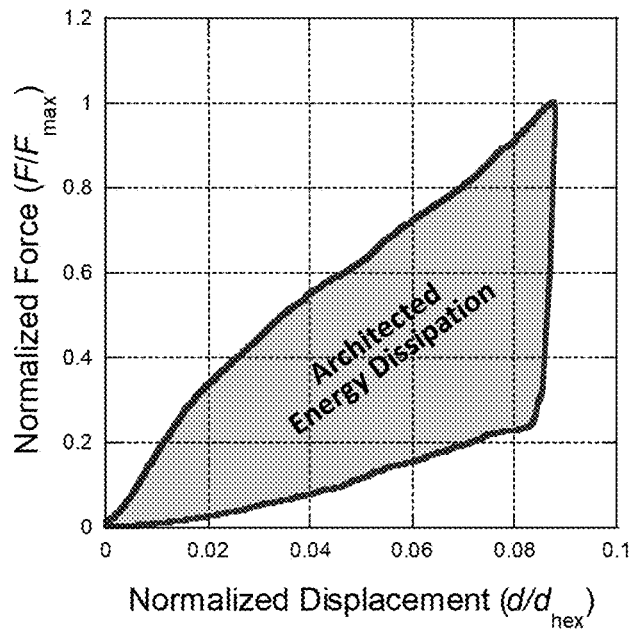

An exemplary unit cell was designed to test the efficacy of employing such coulombic friction elements. FIG. 7A-7B provides images of a hex cell, in which a compressive force is applied to the top horizontal wall. As can be seen, the inner volume of the unit cell is empty. Another architected structure was tested, in which the unit cell includes coulombic friction elements. As seen in FIG. 7C, the unit cell includes two members extending from the top horizontal wall, in which these two upper members interact with a lower member extending form the bottom horizontal wall. Upon compression (FIG. 7D), the surface of the upper members rubs against surfaces of the lower member. Use of such coulombic friction elements provided enhanced energy dissipation, see FIG. 8A-8B.

Example 3: Coulombic Frictional Elements and Gas Damping Chambers

Further architected structures include the use of a coulombic member with a gas damping chamber to provide energy dissipative metamaterials. For instance, additional gas damping can be achieved through the trapping of gas and the control of venting orifices to govern fluid dynamics.

Figure 9A:
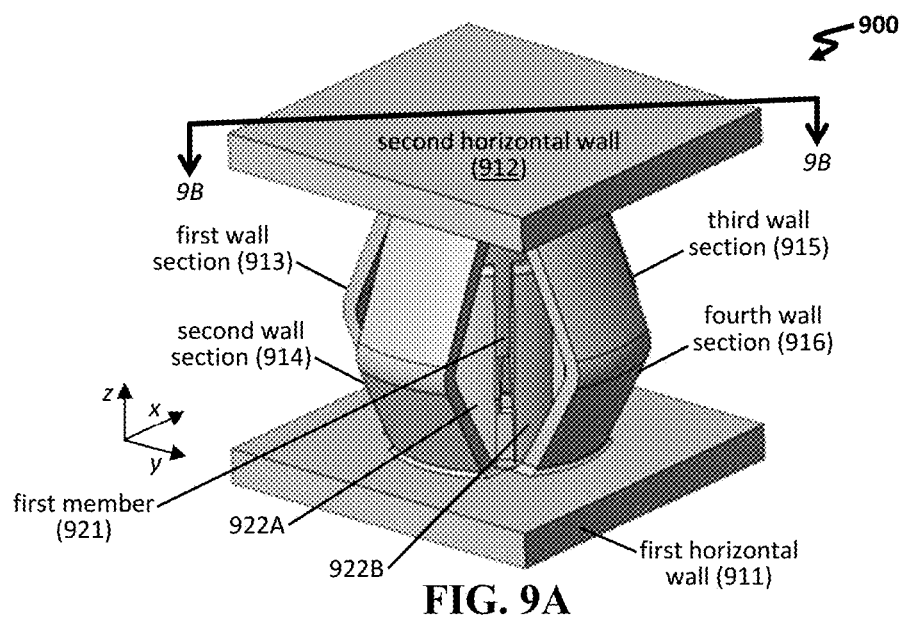
FIG. 9A-9B provides a schematic (FIG. 9A) of an exemplary unit cell 900 having members for energy dissipation by way of coulombic friction and gas damping and a cross-sectional view (FIG. 9B) along line 9B-9B in FIG. 9A.
Figure 9B:
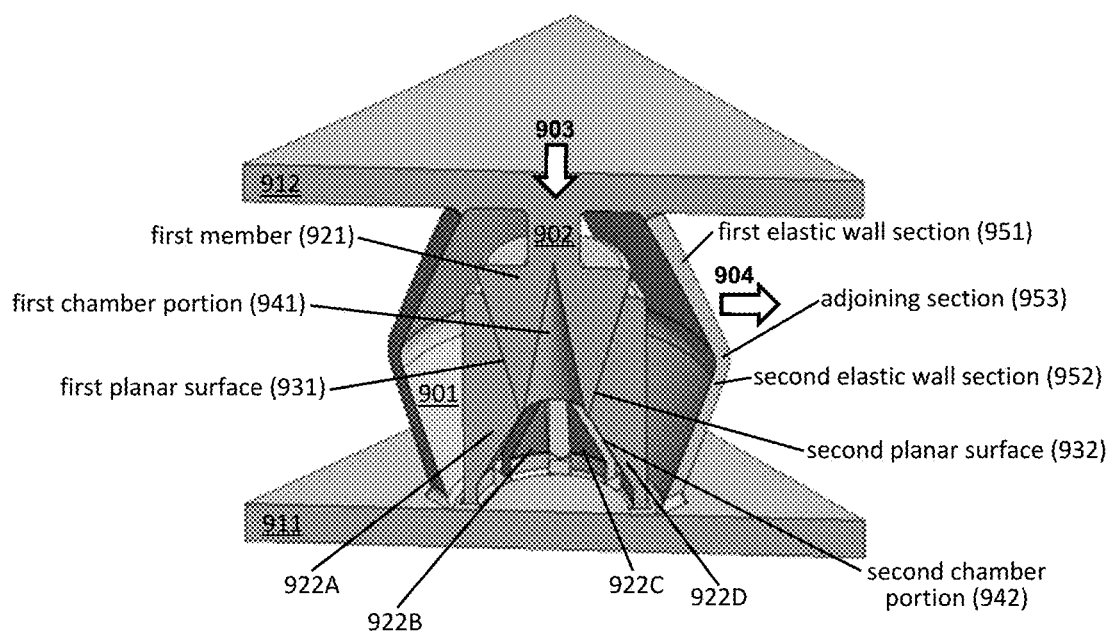

Departing from the hexagonal honeycomb, FIG. 9A-9B provides schematics of a three-dimensional structure with a combination of elastic and coulombic elements with a damping chamber. Provided is a unit cell 900 having a plurality of cell walls defining an inner volume 901, a first member 921, a second member 922A-922D, and a sliding joint formed by an interaction between the first planar surface 931 and the second planar surface 932.

As can be seen, the cell walls can include elastic walls, and any useful combination of cell walls may be employed within each unit cell. In one instance, the unit cell includes two horizontal walls, e.g., a first horizontal wall 911 extending along a first direction and a second horizontal wall 912 extending along a second direction that is parallel to the first direction. The unit cell can include further walls to connect the horizontal walls. In one instance, further walls can include a first wall section 913, a second wall section 914, a third wall section 915, and a fourth wall section 916. Each wall section, in turn, can include a first elastic wall section 951 connected to a second elastic wall section 952 by way of an adjoining section 953.

In use, the first member interacts (or inserts into) the second member. The first and second members can have any useful structural characteristics. As seen in FIG. 9A, the distal end of the first member can include a stem portion 902 that extends form the second horizontal wall 912. The first member can also include a first chamber portion 941, which can be configured to serve as a part of the damping chamber. As also seen in FIG. 9A-9B, the second member can include a plurality of stem sections 922A-922D, which together from a chamber portion 942. In turn, the second chamber portion 942 can be configured to align with the first chamber portion 941, thereby forming an enclosed damping chamber when the first member is actuated (e.g., inserted into the second member by way of displacing one or more of the plurality of cell walls along a normal direction 903 and/or extending the cell wall along a perpendicular direction 904). The second member can include a third chamber portion, which provides the second planar surface 932 and which is configured to receive the first member 921.

Figure 10A:
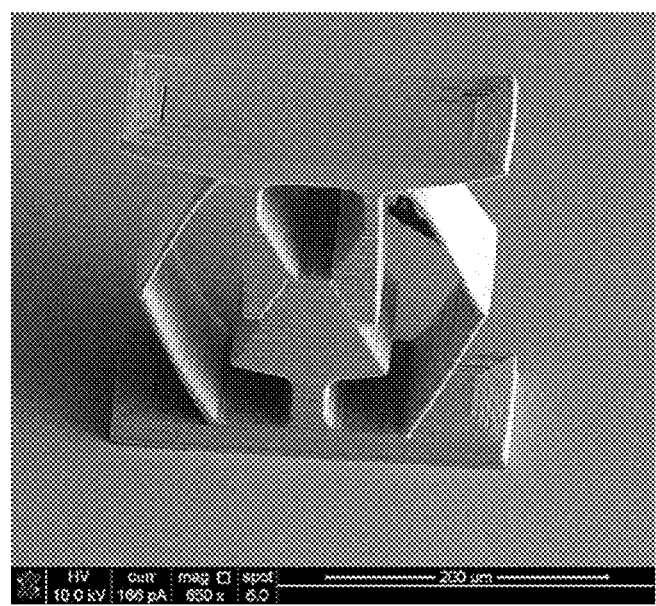
FIG. 10A-10B provides a microphotograph (FIG. 10A) of an exemplary unit cell formed from a photocurable epoxy using a Nanoscribe two-photon lithography system and a microphotograph (FIG. 10B) of a printed of unit cells.
Figure 10B:
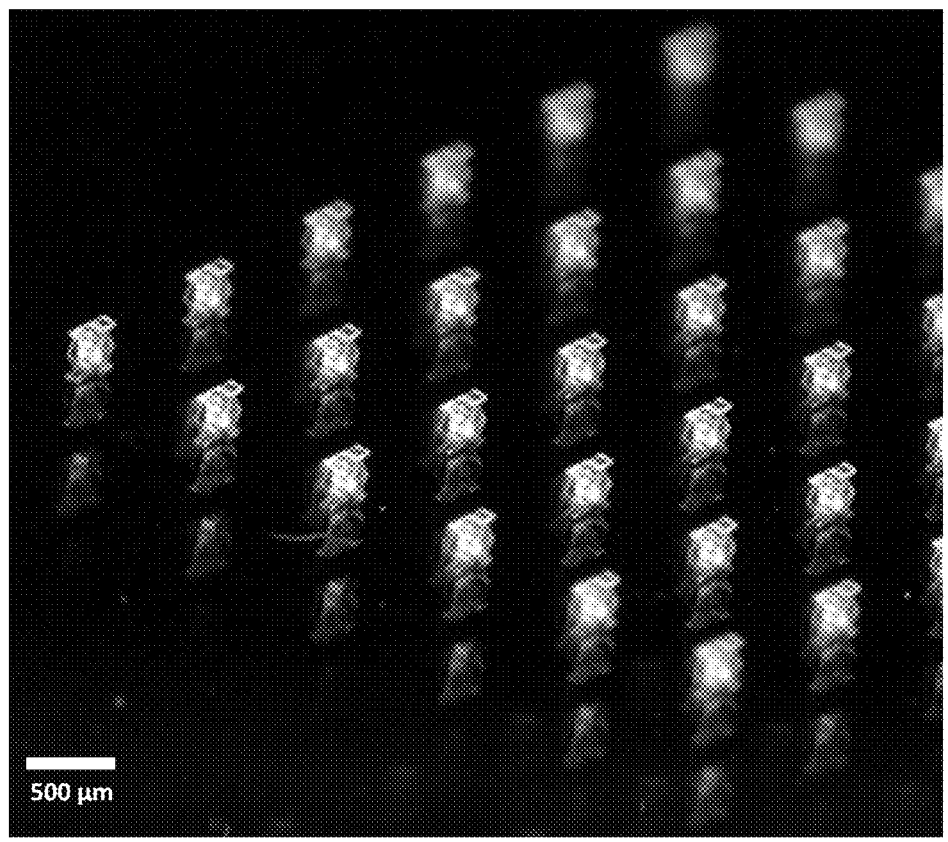

Many 3D printing technologies could produce such structures. FIG. 10A provides an exemplary construct produced using a photocurable epoxy with a Nanoscribe two-photon lithography system (Nanoscribe GmbH, Eggenstein-Leopolds-hafen, Germany). This printed array begins to illustrate the functionality that can be created by tiling these unit cells to make a 2D or 3D array or lattice (FIG. 10B). The illustrated surface can exhibit viscous damping characteristics when in contact with a larger scale feature.

Example 4: Coulombic Friction as a Structural Metamaterial Design Primitive

In recent years, metamaterials have emerged as viable pathways for acoustic, vibration, and thermal damping.

Metamaterials can produce effective, tailorable properties that are unattainable in monolithic materials, such as invisibility cloaking (see, e.g., Fan K et al., "Dynamic electromagnetic metamaterials," *Mater. Today* 2015; 18:39-50; Schurig D et al., "Metamaterial electromagnetic cloak at microwave frequencies," *Science* 2006; 314:977-80; and Liu R et al., "Broadband ground-plane cloak," *Science* 2009; 323:366-9), acoustic wave cloaking (see, e.g., Guenneau S et al., "Acoustic metamaterials for sound focusing and confinement," *New J. Phys.* 2007; 9:399 (18 pp.); Chen H et al., "Acoustic cloaking in three dimensions using acoustic metamaterials," *Appl. Phys. Lett.* 2007; 91:183518 (3 pp.); and Yang Z et al., "Membrane-type acoustic metamaterial with negative dynamic mass," *Phys. Rev. Lett.* 2008; 101: 204301 (4 pp.)), negative refractive indices (see, e.g., Shalaev V M, "Optical negative-index metamaterials," *Nat. Photonics* 2007; 1:41-8; and Smith D R et al., "Metamaterials and negative refractive index," *Science* 2004; 305:788-92), vibration dissipation (see, e.g., Frenzel T et al., "Three-dimensional mechanical metamaterials with a twist," *Science* 2017; 358:1072-4; Peng H et al., "Acoustic metamaterial plates for elastic wave absorption and structural vibration suppression," *Int. J. Mech. Sci.* 2014; 89:350-61; Zhu R et al., "A chiral elastic metamaterial beam for broadband vibration suppression," *J. Sound Vibration* 2014; 333:2759-73; Syam W P et al., "Design and analysis of strut-based lattice structures for vibration isolation," *Precision Eng.* 2018; 52:494-506; and Wang R et al., "Vibration and damping characteristics of 3D printed Kagome lattice with viscoelastic material filling," *Sci. Rep.* 2018; 8:9604 (13 pp.)), and nonlinear thermal expansion (see, e.g., Fan K et al., *Mater. Today* 2015; 18:39-50; Shin J et al., "Mechanical damping behavior of Al/C$_{60}$-fullerene composites with supersaturated Al-C phases," *Composites Part B* 2015; 77:194-8; Chen Y et al., "Hierarchical honeycomb lattice metamaterials with improved thermal resistance and mechanical properties," *Composite Struct.* 2016; 152:395-402; and Hopkins J B et al., "Polytope sector-based synthesis and analysis of microstructural architectures with tunable thermal conductivity and expansion," *J. Mech. Design* 2016; 138:051401 (10 pp.)).

While most metamaterials manipulate electromagnetic waves, structural metamaterials can be topologically tailored to control both elastic wave propagation and energy-dissipating mechanical responses such as plasticity and fracture. Structural metamaterials, known variously as architected materials, periodic cellular structures, micro-trusses, honeycombs, or lattices, typically employ a truss-like arrangement of struts connected at nodes.

Acoustic metamaterials, the primary subclass of structural metamaterials, control dynamic elastic properties by varying lattice topology. Amongst the novel uses of acoustic metamaterials are resonators, which can dampen a narrow frequency band (see, e.g., Casadei F et al., "Piezoelectric resonator arrays for tunable acoustic waveguides and metamaterials," *J. Appl. Phys.* 2012; 112:064902 (5 pp.); and Lee S H et al., "Acoustic metamaterial with negative modulus," *J. Phys. Condens. Matter* 2009; 21:175704 (4 pp.)).

Recent investigations have also explored unique characteristics such as negative effective stiffness and negative Poisson's ratio (see, e.g., Grima J N et al., "Materials that push back," *Nat. Mater.* 2012; 11:565-6; Nicolaou Z G et al., "Mechanical metamaterials with negative compressibility transitions," *Nat. Mater.* 2012; 11:608-13; Chen Y et al., "Lattice metamaterials with mechanically tunable Poisson's ratio for vibration control," *Phys. Rev. Appl.* 2017; 7:024012 (11 pp.); Hewage T A M et al., "Double-negative mechanical metamaterials displaying simultaneous negative stiffness and negative Poisson's ratio properties," *Adv. Mater.* 2016; 28:10323-32; and Babaee S et al., "3D soft metamaterials with negative Poisson's ratio," *Adv. Mater.* 2013; 25:5044-9). However, these design primitives are limited by the elastic response of the structural material. The response of the metamaterial is typically governed by configuring struts to deform elastically in one of five loading modes: bending, buckling, torsion, compression, and tension (see, e.g., Asadpoure A et al., "Topology optimization of multiphase architected materials for energy dissipation," *Comput. Methods Appl. Mech. Eng.* 2017; 325:314-29). Some example architectures include hierarchical honeycombs and pentamode metamaterials, both of which utilize unique, optimized strut and node topologies to introduce dissipation (see, e.g., Sun F et al., "In-plane compression behavior and energy absorption of hierarchical triangular lattice structures," *Mater. Design* 2016; 100:280-90; and Kadic M et al., "On the practicability of pentamode mechanical metamaterials," *Appl. Phys. Lett.* 2012; 100:191901 (4 pp.)).

Beyond elasticity, there are several other deformation mechanisms that present new possibilities for structural metamaterials. Recently, work from Greer and co-workers has utilized plasticity and brittle fracture with hollow-tube lattices in structural metamaterials to tailor mechanical performance (see, e.g., Jang D et al., "Fabrication and deformation of three-dimensional hollow ceramic nanostructures," *Nat. Mater.* 2013; 12:893-8; and Meza L R et al., "Strong, lightweight, and recoverable three-dimensional ceramic nanolattices," *Science* 2014; 345:1322-6). Beyond material deformation, structural interactions could also be utilized in lattice design. Specifically, in the present work, coulombic friction is proposed as an enabling construct for lattice structures that has received little or no attention. By adding coulombic friction as a design primitive for metamaterials, broadening the options for incorporating energy dissipation in lattices.

Some monolithic materials such as and polymers (see, e.g., McCrum N G, "An internal friction study of polytetrafluoroethylene," *J. Polym. Sci.* 1959; 34:355-69) and modified concrete (see, e.g., Scerrato D et al., "A simple non-linear model for internal friction in modified concrete," *Int. J. Eng. Sci.* 2014; 80:136-52; and Scerrato D et al., "Towards the design of an enriched concrete with enhanced dissipation performances," *Cement Concrete Res.* 2016; 84:48-61) possess internal mechanisms for damping.

However, to our knowledge, coulombic topologies have never been applied to a metamaterial construct. Unlike plasticity and fracture, friction offers a repeated source of nonlinear energy dissipation which has been recognized as a pathway to a more diverse breadth of structural metamaterials (see, e.g. Wegener M, "Metamaterials beyond optics," *Science* 2013; 342:939-40).

To explore a first demonstration of coulombic friction as a design primitive, an extruded two-dimensional honeycomb structure was selected as a base topology, since commercially available products like aluminum honeycomb have been employed in lightweight structural designs for decades. This simplistic design construct provides a pedagogical introductory case study; however, the concept applies more broadly to any topological configuration where frictional surfaces are inserted into a lattice architecture.

In the context of the simple constructs shown in FIG. 11A-11D, an approximate analytic model can be derived for the forces, displacements, and mechanical work, or energy. An example of a first-order solution is described in Example 5 below. Such analytic models can provide computationally efficient method to estimate expected scaling laws, perform sensitivity analysis, and evaluate potential tradeoffs in dimensions/material properties.

Figure 11A:
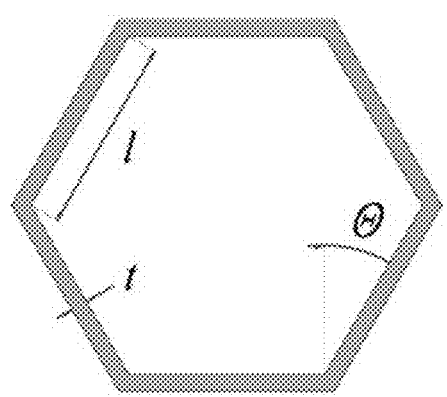
FIG. 11A-11E provides exemplary unit cell structures and simulations of force-displacement response. Shown are schematics of a honeycomb unit cell (FIG. 11A) in its original, open state with geometric parameters of side wall length (l), side wall width (t), and wall angle ($\Theta$); a honeycomb unit cell (FIG. 11B) with a coulombic friction element added and with geometric parameters of second element height (u), second element leg width (w), and first element angle ($\alpha$); a 3D representation (FIG. 11C) of the honeycomb open cell; and a 3D representation (FIG. 11D) of the honeycomb coulombic friction unit cell. Also shown is a finite element simulation (FIG. 11E) of the compressive force-displacement response of a friction element with varying coefficients of friction. The inset of FIG. 11E summarizes the simulated boundary value problem of the frictional element.
Figure 11B:
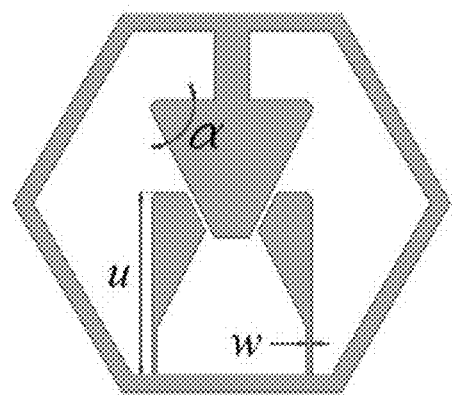
Figure 11C:
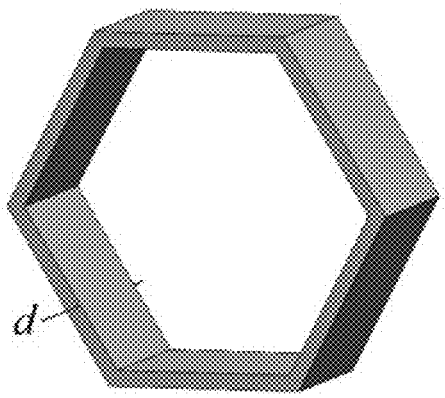
Figure 11D:
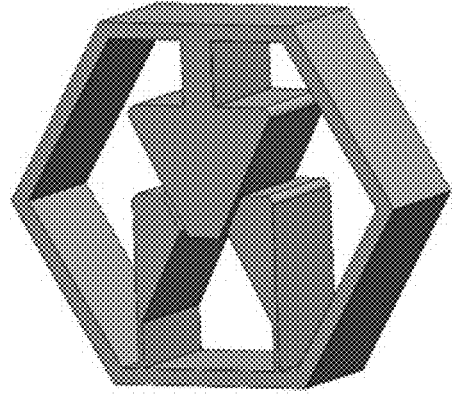
Figure 11E:
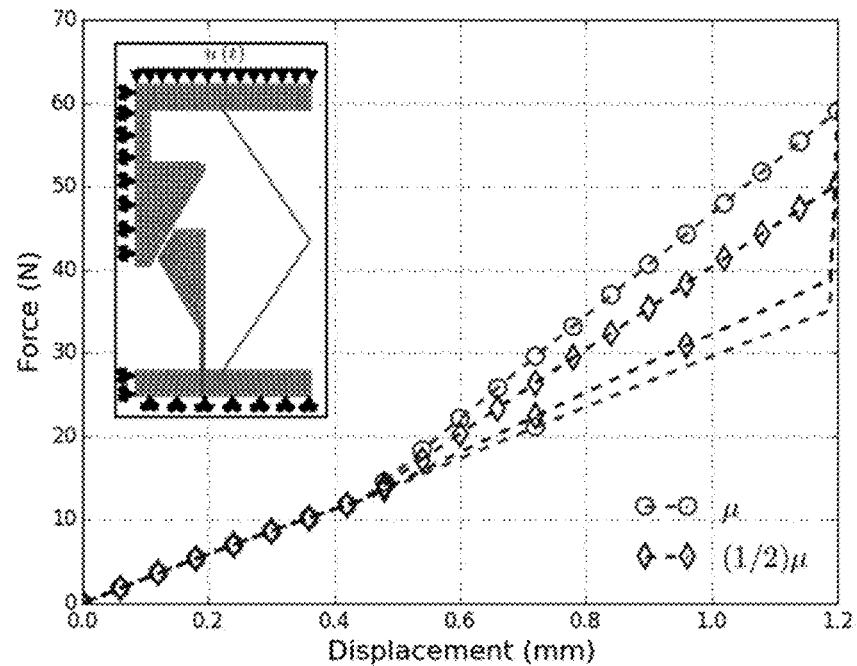

The concept of coulombic dissipation can be further explored using contact models within a finite element framework, the details of which are described in Example 5 below. Within this framework, it is possible to explore parametric variation and design optimization (see, e.g., Hajela P et al., "Genetic algorithms in truss topological optimization," *Int. J. Solids Struct.* 1995; 32:3341-57; and Lu L et al., "Topology optimization of an acoustic metamaterial with negative bulk modulus using local resonance," *Finite Elements Anal. Design* 2013; 72:1-12). The results of such a model with two different coefficients of friction, $\mu=0.25$ or $\mu=0.125$, are shown in FIG. 11E.

Figure 14:
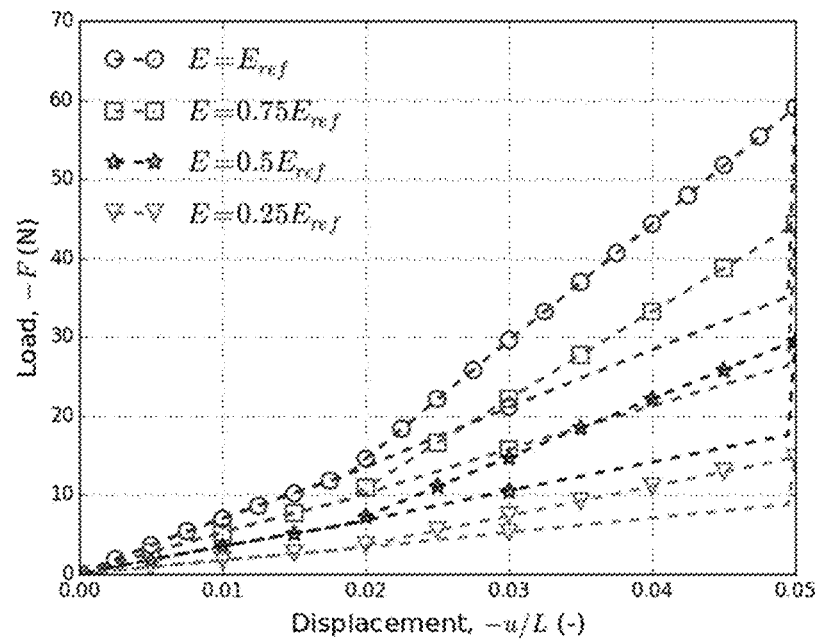
FIG. 14 provides a normalized load versus displacement curve with varying Young's moduli of the base material, as determined by finite element analysis.

Variation with respect to Young's modulus is shown in FIG. 14, which is described in more detail in Example 5. In this example, the Young's modulus was varied to examine its effect on the behavior of the friction element relative to the elastic honeycomb. In the present cell design, the friction legs experienced the highest local loads—both normal and bending. With respect to the former, as stiffness increases so do normal loads and a commensurate relative contribution of friction. On the other hand, as the stiffness is decreased in the legs, larger bending deformations are observed thereby decreasing the normal load and the corresponding dissipation.

To demonstrate the viability of the coulombic friction design construct, proof-of-concept test articles were fabricated with different materials, length scales, and printing methods. Fabrication processes included material jetting of a photocurable polymer using a Stratasys Objet30 printer (Stratasys Ltd., Rehovot, Israel); direct laser writing of a proprietary polymerized photoresist by two-photon lithography using a Nanoscribe Photonic Professional GT (Nanoscribe GmbH, Eggenstein, Germany); and laser powder bed fusion of 316L stainless steel using a 3D Systems ProX 200 (3D Systems, Inc., Rock Hill, S.C.).

The metallic and Objet "macro-polymer" unit cells both had a leg length of $l=1.16$ cm and occupied an effective volume of 2.8 cm$^3$, demonstrating applicability in different material classes. The Nanoscribe "micro-polymer" unit cell had a leg length of $l=140$ μm and occupied an effective volume of 0.005 mm$^3$, demonstrating the concept at a much smaller length scale. Additional dimensions for each of these three systems are included in Example 5. The printing process and material selection affected six primary factors: elastic modulus, minimum printable feature size, maximum print volume, non-linear deformation process(es), part surface roughness, and subsequent friction coefficient.

In all fabrication processes, it was necessary to create a gap between mating frictional surfaces. As a result, some initial elastic deformation was required prior to the onset of frictional dissipation, an effect that was particularly evident in the metal process. For this reason, the metallic structures were plastically preloaded, thereby minimizing the gap between the contacting surfaces.

Samples were compressed to a percentage of their original height. Based on the data gathered for the macro-polymer, micro-polymer, and metallic samples, the addition of a coulombic friction element introduces hysteretic damping. It is useful to define a figure of merit for dissipative unit cells, such as a non-dimensional dissipation factor R, which is defined here as the ratio of the total work to deform the friction unit cell, $W_{FrictionCell}$, normalized by the work to deform the open cell alone, $W_{OpenCell}$:

$$R = \frac{W_{FrictionCell}}{W_{OpenCell}}. \quad (eq. 1)$$

In the case of the honeycomb-based friction element, the relative contributions of elastic energy and frictional dissipation can be tailorable to the desired outcome via the honeycomb and friction element geometries. The observed dissipation factors for the design constructs in the current study are listed in Table 1.

TABLE 1

Dissipation factors for coulombic friction versus open honeycomb cells of varying materials and size

| Material | Side wall width, t [mm] | Unit cell volume, V [mm$^3$] | Energy dissipated in friction unit cell [mJ] | Dissipation factor, R | Specific energy from frictional element, γ [Pa] |
|---|---|---|---|---|---|
| Macro-polymer | 0.50 | 2800 | 0.23 | 2.9 | 53 |
|  | 1.0 | 2800 | 0.76 | 1.5 | 97 |
| Micro-polymer | 0.01 | 0.0051 | 0.00025 | 4.6 | 37000 |
| Metallic | 0.35 | 2800 | 14 | 23 | 4900 |
|  | 1.1 | 2800 | 23 | 1.1* | 8200 |

*Unlike the other unit cells, the metallic unit cell with thicker 1.1 mm legs dissipated energy primarily through plastic deformation of the hexagonal support structure, with only minor contribution from friction.

By decreasing the side wall width of the hexagonal support structure, the work contribution of the elastically deforming hexagon decreased, and the resulting dissipation factor correspondingly increased. In the case of the metallic structure, a three-fold decrease in the side wall width resulted in a ~20× increase in the dissipation factor. These tradeoffs can be tuned for a particular application through finite element analyses akin to the results shown in FIG. 11E and FIG. 14.

In addition to the dimensionless dissipation factor described previously, it can also be useful to quantify the actual energy dissipated for particular constructs. For example, in the microscale construct, the frictional cell dissipated 251 nJ compared to the 54 nJ for the reference open cell (R=5). In this first demonstration, the energy absorbed by a single unit cell was varied by over five orders of magnitude.

A second figure of merit can be the specific energy of the friction element, normalized by the effective volume, V:

$$\gamma = \frac{W_{FrictionCell} - W_{OpenCell}}{V}. \quad (eq. 2)$$

This parameter γ, tabulated for each of the tested structures in Table 1, can be specifically useful to understand the volumetric efficiency of the dissipation. By reducing the unit cell volume by six orders of magnitude, the specific dissipation increased by three orders of magnitude for polymeric structures.

Figure 12A:
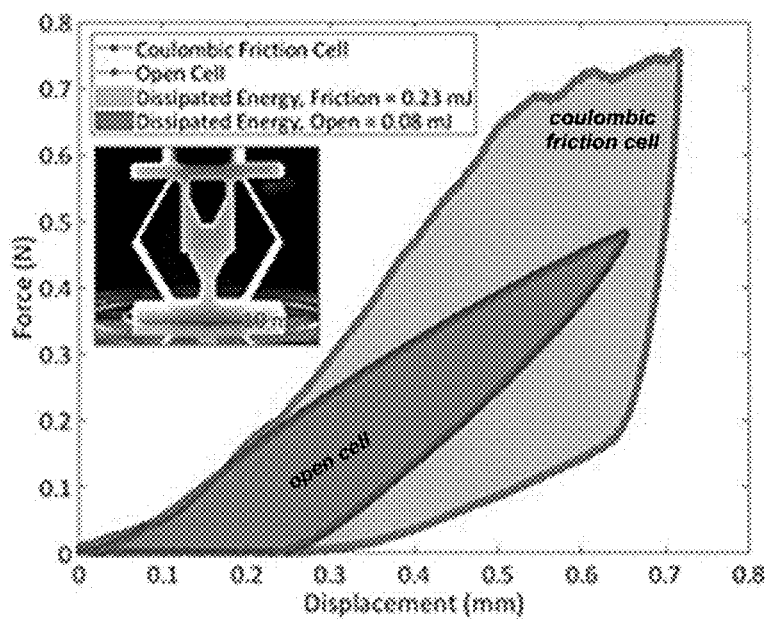
FIG. 12A-12C provides force versus displacement curves for macro-polymer hex cells (FIG. 12A), micro-polymer hex cells (FIG. 12B), and metallic hex cells (FIG. 12C). The total energy dissipated for the sample is listed in the legend. The graphs visualize the difference in dissipation factor for open versus friction hex cells.
Figure 12B:
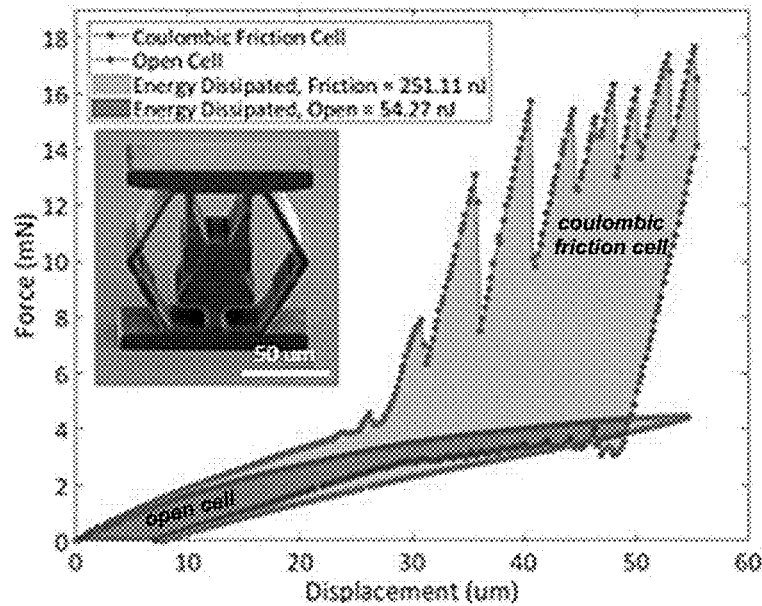
Figure 12C:
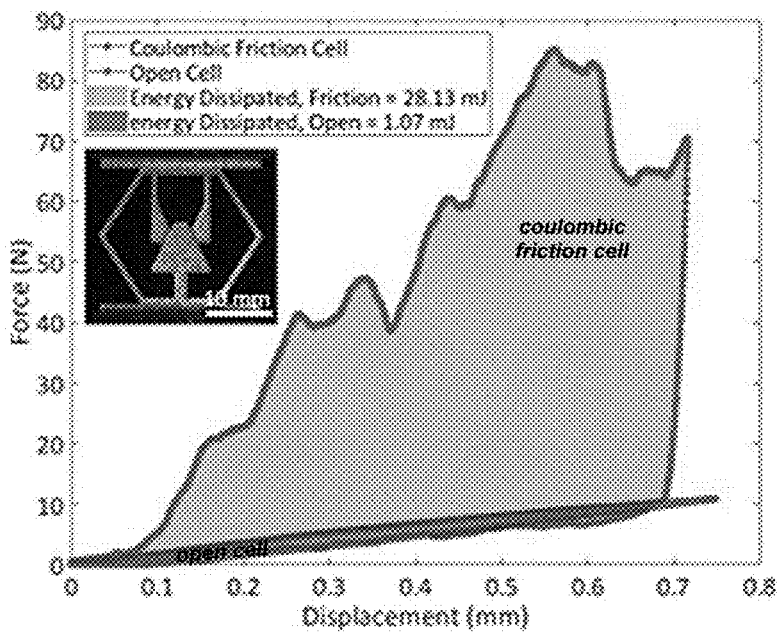

FIG. 12A-12C compares energy dissipations for the open and coulombic hex cells. In both the metallic and microscale polymer systems (FIG. 12C and FIG. 12B, respectively), spikes in the frictional phase are due to the surface topography associated with layer-wise printing.

The smallest scaled unit cells provide improved volumetric efficiency. Without wishing to be limited by mechanism, there may be several factors that affected the scalability of the unit cell performance. At the macroscale, scaling is largely controlled by three factors: the stiffness of the hexagonal unit cell walls, the stiffness of the pair of friction legs, and the coefficient of friction between the sliding surfaces. The scaling behavior as predicted by the analytic model are included in Example 5.

There is also a practical scaling issue as the minimum feature sizes approach the resolution of the manufacturing method. For example, in powder bed methods, a ~50-100 µm skin layer of poorly fused, rough surface can contribute to the measured thickness but may not effectively load bearing (see, e.g., Salzbrenner B C et al., "High-throughput stochastic tensile performance of additively manufactured stainless steel," *J. Mater. Process. Technol.* 2017; 241:1-12).

For microfabricated lattices, as the unit cell is scaled into the micrometer regime and below, additional scaling factors can arise such as those associated with electrostatic forces, fluid damping, etc. (see, e.g., Wautelet M, "Scaling laws in the macro-, micro- and nanoworlds," *Eur. J. Phys.* 2001; 22:601-11). A second scaling consideration can be the size-dependence of intrinsic material properties. For example, the material modulus can be affected as the number of grains in the structure becomes small or if the grains possess strong crystallographic texture.

Figure 13:
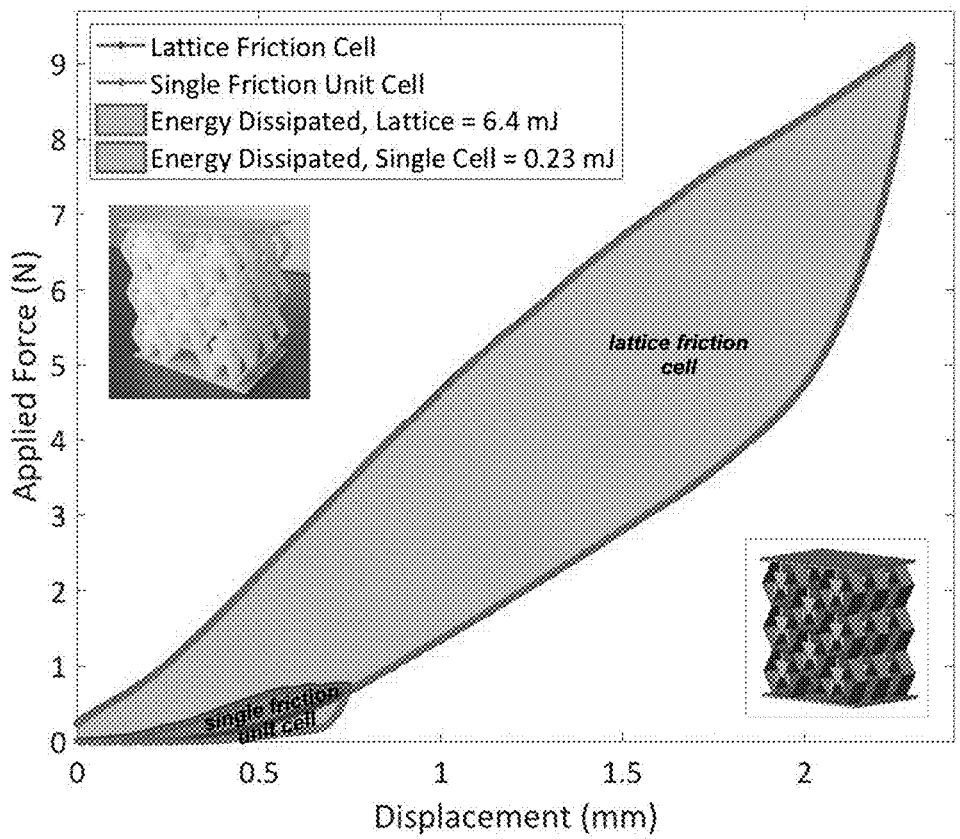
FIG. 13 provides a graph showing energy dissipation of a friction lattice versus a single friction cell, deformed to impart approximately the same degree of deformation at the unit cell level. The inset figures show the lattice structure as printed and a corresponding solid model.

While the focus of the present study has been on the coulombic unit cell concept as a design construct, a demonstration of a tiled lattice illustrates the likely use as a metamaterial. As shown in FIG. 13, the macro-polymer unit cell was tiled in a three-dimensional array of 24 unit cells. The dissipated energy of the lattice was 28× higher than that of an individual unit cell. Without wishing to be limited by mechanism, the minor discrepancy between number of unit cells and energy absorbed could be due to minor differences in unit cell dimensions/quality, interface losses between unit cells, and/or nonlinear contributions from interior unit cells relative to near-surface unit cells. While the hexagonal structure with a unidirectional friction element was useful to demonstrate the concept, other three-dimensional tiling or multi-directional loadings can be envisioned.

Figure 15:
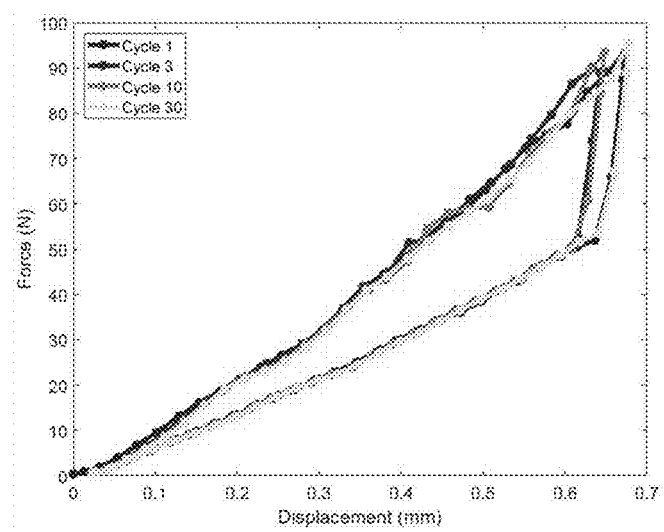
FIG. 15 provides a graph showing a metallic friction cell compressed over 30 cycles to a maximum force load of about 90 N. The metallic friction cell was cycled over 30 compressions to reach ~3% compression of its overall height.

To demonstrate the reusability of the dissipative coulombic construct, a metallic unit cell was cyclically loaded through 30 force-controlled cycles, as shown FIG. 15. The metallic cells exhibited only slight break-in, with the energy dissipation decreasing from 9.8 mJ to 9.0 mJ over 30 cycles. This slight reduction could be attributable to reduction in the surface roughness of the as-printed part and/or microplastic ratcheting. A detailed study of cycle-dependent evolution in frictional response could enable some applications and would depend on the material/process of interest.

In conclusion, coulombic friction as a design construct can provide a customizable topology capable of broadband energy dissipation. By using friction elements within an architected material, one can harness the heat released as broadband energy dissipation to improve a material's damping performance through topology. Coulombic friction as a mechanical dissipation design primitive is available amongst material types and length scales. With this construct, it is possible to design effective dissipative properties in materials that have no intrinsic reversible dissipation, such as most metals and ceramics. The concept can apply broadly to many industrial sectors such as transportation (e.g., monolithic shock absorbers), biomedical (e.g., damping prosthetics), athletic equipment (e.g., skis, bicycles, etc.), defense (e.g., impact tolerant munitions), and energy (e.g., survivable electrical grid components).

Example 5: Experimental Details

Provided herein are exemplary details for experiments described in Example 4.

Fabrication:

Two honeycomb cell structures were created using three different materials and methods: material jetting process using a Stratasys Objet 30 with a photocurable ABS-like polymer, Stratasys VeroWhitePlus RGD835; a direct laser writing two-photon lithography process using a commercial Nanoscribe system in a proprietary polymerized photoresist; and a laser powder bed fusion process using a 3D Systems ProX 200 with 316L stainless steel. The hex cells were printed at their respective dimensions listed in Table 2.

TABLE 2

Hex cell dimensions for proof-of-concept geometries
Lattice Data

| Material | Dimensions | | | | | | | Dissipation factor, R | Volumetric efficiency, γ (GPa) |
| | t [mm] | l [mm] | Θ [degrees] | w [mm] | u [mm] | a [degrees] | d [mm] | | |
| --- | --- | --- | --- | --- | --- | --- | --- | --- | --- |
| Macro-polymer | 0.5 | 11.55 | 30 | 0.45 | 10.85 | 63.43 | 8 | 2.9 | $5.3 \times 10^{-8}$ |
| | 1 | 11.55 | 30 | 0.45 | 10.85 | 63.43 | 8 | 1.5 | $9.7 \times 10^{-8}$ |
| Micro-polymer | 0.01 | 0.14 | 30 | 0.0125 | 0.136 | 63.43 | 0.1 | 4.6 | $3.7 \times 10^{-5}$ |
| Metallic | 0.35 | 11.55 | 30 | 0.45 | 10.85 | 63.43 | 8 | 23 | $4.9 \times 10^{-6}$ |
| | 1.1 | 11.55 | 30 | 0.45 | 10.85 | 63.43 | 8 | 1.1 | $8.2 \times 10^{-6}$ |

Testing:

Compression tests were conducted with varying load cells based on the material strength and type. The macro-polymer and metallic samples were tested using a mini bionix frame. The macro-polymer was compressed using a 45 N load cell while the metallic sample was compressed with a 2224 N load cell. The micro-polymers were compressed using a MEMS Probe Station with a 0.1 N load cell.

Cyclic loading was demonstrated on two apparatuses using the mini bionix load frame. Metallic hex cells used a 445 N load force, cycling around 90 N for the coulombic friction cell and 20 N for the open cell. The macro-polymer lattice structure was compressed over around a cyclic load of 5 N for the friction cell and 4 N for the open hex cell to reach a displacement of ~3%. A 445 N load cell was used for 100 compressive cycles.

Analytic Model Calculations:

The force, F, needed for a honeycomb cell to be deformed to a given cell-displacement, δ, in the vertical direction of FIG. 11A-11D may be easily calculated. To accomplish this task, the open hex cell side walls were treated as separate cantilevers; each of length l/2. Following the work of Gibson (see, e.g., Gibson L J & Ashby M F, "Cellular Solids: Structure and Properties," 1997 (2d ed.), Cambridge University Press (Cambridge, England)), the honeycomb displacement was written as follows:

$$\delta = \frac{2F \times \sin^2(\theta) \times \left(\frac{l}{2}\right)^3}{3E_s \times I} = \frac{F \times \sin^2(\theta) \times l^3}{12E_s \times I}, \quad \text{(eq. 3)}$$

in which F is the displacement force, θ is the angle between an inclined edge of the hex cell side wall and an axis normal to the horizontal side wall of the hex cell, l is length of a hex cell side wall, $E_S$ is the elastic modulus of the material, and I is the moment of inertia for the assumed geometry:

$$I = \frac{dt^3}{12}, \quad \text{(eq. 4)}$$

in which d is the depth of the unit cell and t is the thickness of unit cell wall. The displacement relation may then be solved for F to get the open cell force, $F_{open}$, as follows:

$$F_{open} = \frac{E_s \times dt^3 \times \delta}{\sin^2(\theta) \times l^3}. \quad \text{(eq. 5)}$$

Equations (3) and (5) may then be combined, thereby leading to an expression for the open cell work in terms of the applied displacement, follows:

$$W_{OpenCell} = 4 \times F_{open} \times \delta = \frac{4E_s \times dt^3 \times \delta^2}{\sin^2(\theta) \times l^3}. \quad \text{(eq. 6)}$$

To reach the same applied displacement as the open honeycomb cell, the coulombic friction honeycomb cell will require an increased force due to the bending and sliding of the friction legs. The friction unit cell possesses two additional cantilevers that deform in bending with force $F_{bend}$ over distance $\delta_{bend}=\delta \cot(\alpha)$ and two friction surfaces that are driven by the elastic force of the cantilever acting on the wedge with force $\mu F_{normal}$ over distance $\delta_{slid}=\delta \csc(\alpha)$ and $F_{normal}=F_{bend} \sec(\alpha)$.

While analytic cantilever equations are available for various tapered cross-sections, for the purposes of a simple first-order approximation, the bending cantilever arms are approximated as uniform in cross-section, dt over the entire length u and the cantilever makes contact with the ramp at the end of its length u. The following equations describe cantilever deflection and force:

$$\delta_{bend} = \frac{F(u)^3}{3E_s \times I} = \frac{4F \times u^3}{E_s \times dt^3}, \quad \text{(eq. 7)}$$

which may be rearranged to get the following:

$$F_{bend} = \frac{E_s \times dt^3 \times \delta_{bend}}{4u^3} = \frac{E_s \times dt^3 \times \delta\cot(\alpha)}{4u^3}. \quad \text{(eq. 8)}$$

Assuming separate work contributions for each loading model, the total work of the friction cell may be written as follows:

$$W_{FrictionCell}=W_{OpenCell}+W_{bend}+W_{sliding}. \quad \text{(eq. 9)}$$

The full unit cell contains two halves of the hexagon, two cantilevers, and two sliding surfaces, resulting in the following work calculation:

$$W_{FrictionCell}=4F_{open}\delta+2F_{bend}\delta \cot(\alpha)+2\mu F_{bend} \sec(\alpha)\delta \csc(\alpha). \quad \text{(eq. 10)}$$

The total work of the friction cell may then be written as follows:

$$W_{FrictionCell} = \frac{4E_s \times dt^3 \times \delta^2}{\sin^2(\theta) \times l^3} + \frac{E_s \times dt^3 \times \delta^2\cot^2(\alpha)}{2u^3} + \frac{\mu \times E_s \times dt^3 \times \delta^2\cot(\alpha)\sec(\alpha)\csc(\alpha)}{2u^3}, \quad \text{(eq. 11)}$$

which simplifies as follows:

$$W_{FrictionCell} = \quad \text{(eq. 12)}$$
$$4E_s \times dt^3 \times \delta^2 \left[\frac{1}{l^3\sin^2(\theta)} + \frac{1}{8u^3\tan^2(\alpha)} + \frac{\mu}{8u^3\sin^2(\alpha)}\right].$$

For a hexagonal unit cell, the volume is described as follows:

$$V=2\times d \times l \times \cos(\theta) \times (l \sin(\theta)+h), \quad \text{(eq. 13)}$$

and the specific energy of the frictional elements (bending and friction) by unit volume can be described as follows:

$$\gamma = \frac{W_{FrictionCell} - W_{OpenCell}}{V} = \quad \text{(eq. 14)}$$
$$\frac{4E_s \times t^3 \times \delta^2}{l\cos\theta \times (l\sin\theta + h) \times u^3}\left[\frac{1}{8\tan^2(\alpha)} + \frac{\mu}{8\sin^2(\alpha)}\right].$$

Finite Element Analysis:

The problem of interest was modeled using the implicit, quasi-static capabilities of the Sierra/SolidMechanics finite element program (see, e.g., Sierra/SM Development Team, Sierra/SM 4.40 User's Guide, SAND Report 2016-2707). To this end, a quarter symmetry model of the geometry was constructed as shown in FIG. 11E and was meshed with reduced integration, uniform gradient hexahedron elements. Symmetry conditions were placed on the corresponding planes, and the bottom surface was fixed in the direction of loading. A uniform displacement was prescribed along the top surface as indicated.

The structure was taken to be comprised of a homogeneous elastic material with properties (an elastic modulus of 196 GPa and Poisson's ratio of 0.3) corresponding to an A316 stainless steel (properties from Table 4.1.4 of [3]). Contact was enabled between the relevant surfaces and enforced via an Augmented Lagrangian scheme. A constant friction value of μ of 0.25 corresponding to room temperature dry conditions for mild steel was used, as given in Table 3.2 of "Mechanics of Solid Materials," (Lemaitre J & Chaboche J L, 1990, Cambridge University Press (Cambridge, England)). Results of such simulations are shown in FIG. 11E. To consider the impact of base material elastic modulus, FIG. 14 presents the load versus normalized displacement result for four different moduli. Decreased loads and dissipation may be noted with lower elastic moduli.

OTHER EMBODIMENTS

All publications, patents, and patent applications mentioned in this specification are incorporated herein by reference to the same extent as if each independent publication or patent application was specifically and individually indicated to be incorporated by reference.

While the invention has been described in connection with specific embodiments thereof, it will be understood that it is capable of further modifications and this application is intended to cover any variations, uses, or adaptations of the invention following, in general, the principles of the invention and including such departures from the present disclosure that come within known or customary practice within the art to which the invention pertains and may be applied to the essential features hereinbefore set forth, and follows in the scope of the claims.

Other embodiments are within the claims.

The invention claimed is:

1. A metamaterial comprising a plurality of unit cells, wherein each unit cell comprises:
   a plurality of cell walls defining an inner volume, wherein at least two of the cell walls are configured to be elastic walls capable of being displaced along a normal direction;
   a first member disposed within the inner volume and comprising a first planar surface;
   a second member disposed within the inner volume and comprising a second planar surface; and
   an interacting joint comprising a sliding movement between the first and second planar surfaces upon displacement of the elastic walls along the normal direction that provides energy dissipation by way of friction.

2. The metamaterial of claim 1, wherein the first member comprises a first comb structure, the second member comprises a second comb structure, and the first and second comb structures are configured to interlace with one another upon displacement of the elastic walls along the normal direction, wherein the interlacing movement provides energy dissipation.

3. The metamaterial of claim 1, wherein the first member comprises a conical portion providing the first planar surface, the second member comprises a chamber portion providing the second planar surface, and the first conical portion is configured to be inserted into the chamber portion upon displacement of the elastic walls along the normal direction, wherein the insertion movement provides energy dissipation.

4. The metamaterial of claim 1, wherein the second member further comprises a damping chamber configured to form an enclosed chamber upon contact between the first and second planar surfaces of the interacting joint, and wherein formation of the enclosed chamber provides further energy dissipation.

5. The metamaterial of claim 1, wherein each of the plurality of cell walls comprises an elastic wall.

6. The metamaterial of claim 5, wherein the elastic wall comprises a first elastic wall section, a second elastic wall section, and an adjoining section disposed between the first and second elastic wall sections; and wherein the adjoining section is configured to allow the first and second elastic walls to be displaced along the normal direction and to be extended along a perpendicular direction.

7. The metamaterial of claim 1, wherein the plurality of cell walls comprises a first horizontal wall, a second horizontal wall, a first sloped wall, a second sloped wall, a third sloped wall, and a fourth sloped wall; and wherein each of the first, second, third, and fourth sloped walls are disposed between the first and second horizontal walls.

8. The metamaterial of claim 7, wherein each of the first, second, third, and fourth sloped walls comprises an elastic wall.

9. The metamaterial of claim 8, wherein each elastic wall comprises a first elastic wall section, a second elastic wall section, and an adjoining section disposed between the first and second elastic wall sections; and wherein the adjoining section is configured to allow the first and second elastic walls to be displaced along the normal direction and to be extended along a perpendicular direction.

10. The metamaterial of claim 1, wherein the first member and/or the second member comprises a stem configured to bend upon displacement of the elastic walls along the normal direction.

11. A metamaterial comprising a plurality of unit cells, wherein each unit cell comprises:
    a plurality of cell walls defining an inner volume, wherein the plurality of cell walls comprises:
      a first horizontal wall extending along a first direction,
      a second horizontal wall disposed above the first horizontal wall and extending along a second direction that is parallel to the first direction,
      a first wall section,
      a second wall section,
      a third wall section, and
      a fourth wall section, wherein each of the first, second, third, and fourth wall sections are disposed between the first and second horizontal walls, wherein each of the first, second, third, and fourth wall sections comprises a first sloped wall, a second sloped wall, and an adjoining section disposed between the first and second sloped walls, and wherein the adjoining section is configured to allow the first and second sloped walls to be displaced along the normal direction and to be extended along a perpendicular direction;
    a first member disposed within the inner volume and comprising a first planar surface, wherein the first member extends from an inner surface of the first horizontal wall;
    a second member disposed within the inner volume and comprising a second planar surface, wherein the second member extends from an inner surface of the second horizontal wall, and wherein the second member comprises a plurality of stem sections, and wherein each stem section comprises a planar surface configured to interaction with a portion of the first planar surface of the first member; and
    an interacting joint comprising an interacting movement between the first and second planar surfaces upon displacement of one or more of the plurality of cell walls along the normal direction, wherein the interacting movement provides energy dissipation.

12. The metamaterial of claim 11, wherein the first member further comprises a first chamber portion.

13. The metamaterial of claim 12, wherein the second member further comprises a second chamber portion; wherein the first and second chamber portions are configured to form an enclosed, damping chamber upon contact between the first and second planar surfaces of the interacting joint; and wherein formation of the enclosed, damping chamber provides further energy dissipation.

14. The metamaterial of claim 11, wherein the plurality of stem sections forms a second chamber portion; wherein the first and second chamber portions are configured to form an enclosed, damping chamber upon contact between the first planar surface and the planar surfaces of the plurality of stem sections; and wherein formation of the enclosed, damping chamber provides further energy dissipation.

15. The metamaterial of claim 11, wherein the first member further comprises a first chamber portion; wherein the second member further comprises a second chamber portion; wherein the interacting movement comprises displacement of the first, second, third, and fourth wall sections along the normal direction; wherein the first and second chamber portions are configured to form an enclosed, damping chamber upon contact between the first and second planar surfaces of the interacting joint; and wherein formation of the enclosed, damping chamber provides further energy dissipation.

16. The metamaterial of claim 15, wherein the interacting joint comprises a sliding joint.

17. The metamaterial of claim 11, wherein:
the first member further comprises a conical portion providing the first planar surface, wherein the conical portion comprises a first chamber portion;
the second member further comprises a second chamber portion and a third chamber portion providing the second planar surface, wherein the third chamber portion is configured to receive the conical portion of the first member;
the interacting movement comprises an insertion movement between the first member and the second member upon displacement of the first, second, third, and fourth wall sections along the normal direction, wherein the insertion movement comprises insertion of the conical portion of the first member into the third chamber portion of the second member; and
the first and second chamber portions are configured to form an enclosed, damping chamber upon contact between the first and second planar surfaces of the interacting joint, wherein formation of the enclosed, damping chamber provides further energy dissipation.

* * * * *